United States Patent
Cherkasova et al.

(10) Patent No.: US 9,135,075 B2
(45) Date of Patent: Sep. 15, 2015

(54) CAPACITY PLANNING FOR COMPUTING SYSTEMS HOSTING MULTI-TIER APPLICATION BASED ON THINK TIME VALUE AND RESOURCE COST OF COMPOSITE TRANSACTION USING STATISTICAL REGRESSION ANALYSIS

(75) Inventors: Ludmila Cherkasova, Fort Collins, CO (US); Qi Zhang, Fort Collins, CO (US); Guy Mathews, Fort Collins, CO (US); Wayne Greene, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1613 days.

(21) Appl. No.: 11/684,569

(22) Filed: Mar. 9, 2007

(65) Prior Publication Data

US 2008/0221941 A1    Sep. 11, 2008

(51) Int. Cl.
G06F 9/46         (2006.01)
G06F 15/173       (2006.01)
G06F 9/50         (2006.01)
G06F 11/34        (2006.01)

(52) U.S. Cl.
CPC ............ *G06F 9/505* (2013.01); *G06F 11/3409* (2013.01); *G06F 11/3414* (2013.01); *G06F 11/3442* (2013.01); *G06F 11/3452* (2013.01); *G06F 11/3423* (2013.01); *G06F 2201/87* (2013.01); *G06F 2209/508* (2013.01)

(58) Field of Classification Search
USPC ......................................................... 718/104
See application file for complete search history.

(56) References Cited

U.S. PATENT DOCUMENTS

| | | | | | |
|---|---|---|---|---|---|
| 6,006,260 | A * | 12/1999 | Barrick et al. | ................. | 709/224 |
| 6,108,700 | A * | 8/2000 | Maccabee et al. | ............ | 709/224 |
| 6,470,464 | B2 * | 10/2002 | Bertram et al. | ................. | 714/37 |
| 6,477,483 | B1 * | 11/2002 | Scarlat et al. | ................. | 702/186 |
| 6,862,623 | B1 * | 3/2005 | Odhner et al. | ................. | 709/226 |
| 6,898,564 | B1 * | 5/2005 | Odhner et al. | ................. | 703/21 |
| 7,290,048 | B1 * | 10/2007 | Barnett et al. | ................. | 709/223 |
| 7,401,143 | B2 * | 7/2008 | Oulu et al. | ..................... | 709/224 |
| 7,415,453 | B2 * | 8/2008 | Suzuki et al. | ......................... | 1/1 |
| 7,434,204 | B1 * | 10/2008 | Everingham et al. | ......... | 717/120 |
| 7,437,450 | B1 * | 10/2008 | Gore et al. | ..................... | 709/224 |
| 7,505,415 | B2 * | 3/2009 | Murgatroyd et al. | ......... | 370/241 |
| 7,577,701 | B1 * | 8/2009 | Johns et al. | ................... | 709/203 |
| 7,676,706 | B2 * | 3/2010 | Addleman et al. | .............. | 714/57 |
| 2002/0099521 | A1 * | 7/2002 | Yang et al. | ..................... | 702/186 |
| 2002/0099816 | A1 * | 7/2002 | Quarterman et al. | ......... | 709/224 |
| 2002/0120727 | A1 * | 8/2002 | Curley et al. | ................. | 709/223 |
| 2002/0138226 | A1 * | 9/2002 | Doane | .......................... | 702/119 |
| 2003/0065702 | A1 * | 4/2003 | Singh et al. | ................... | 709/105 |
| 2005/0005012 | A1 * | 1/2005 | Odhner et al. | ................. | 709/226 |
| 2005/0021530 | A1 * | 1/2005 | Garg et al. | ..................... | 707/100 |
| 2005/0091640 | A1 * | 4/2005 | McCollum et al. | ........... | 717/117 |
| 2005/0102318 | A1 * | 5/2005 | Odhner et al. | ................. | 707/102 |
| 2005/0278439 | A1 * | 12/2005 | Cherkasova | .................. | 709/223 |
| 2005/0278453 | A1 * | 12/2005 | Cherkasova | .................. | 709/231 |
| 2006/0013134 | A1 * | 1/2006 | Neuse | .......................... | 370/230 |
| 2006/0015512 | A1 * | 1/2006 | Alon et al. | ..................... | 707/100 |
| 2006/0089982 | A1 * | 4/2006 | Abbott et al. | .................. | 709/223 |
| 2006/0161884 | A1 * | 7/2006 | Lubrecht et al. | .............. | 717/104 |
| 2006/0235664 | A1 * | 10/2006 | Vinberg et al. | ................... | 703/6 |

\* cited by examiner

*Primary Examiner* — Abdullah Al Kawsar

(74) *Attorney, Agent, or Firm* — Fulbright & Jaworski L.L.P.

(57) ABSTRACT

A method comprises receiving, by a workload profiler, a representative workload of a computing system under analysis. The workload profiler determines a workload profile of the computing system that reflects a transaction mix that varies over time. A capacity analyzer receives the workload profile, and determines a maximum capacity of the computing system under analysis for serving the workload profile while satisfying a defined quality of service (QoS) target.

17 Claims, 9 Drawing Sheets

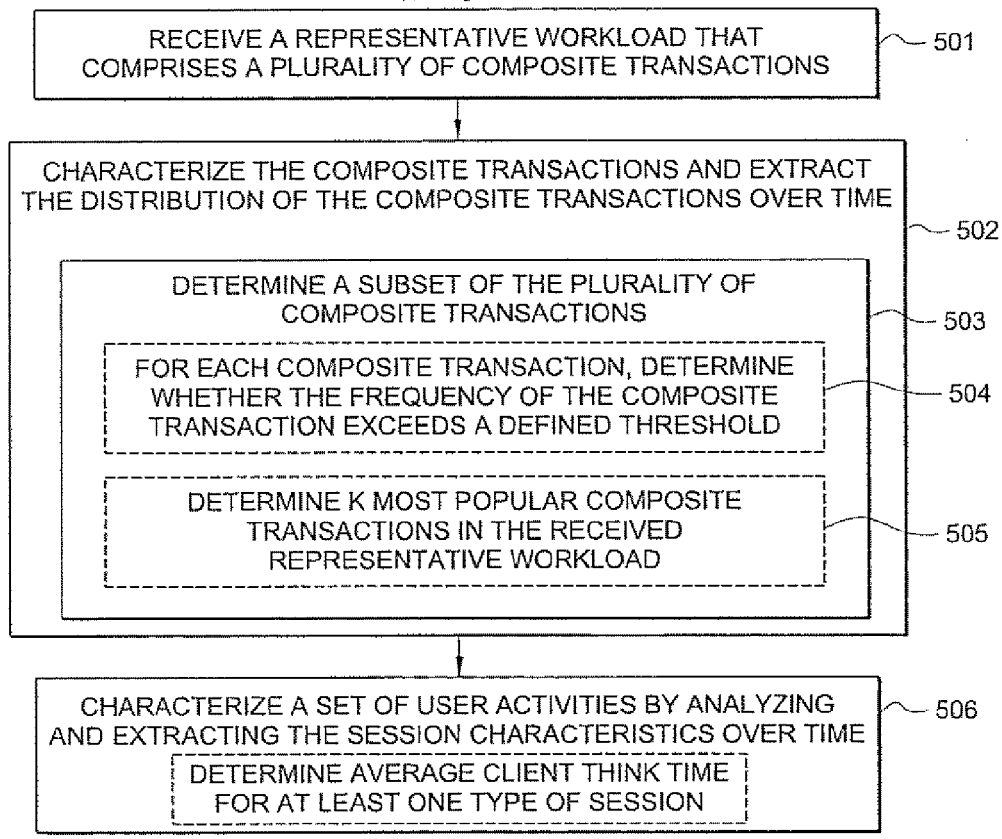
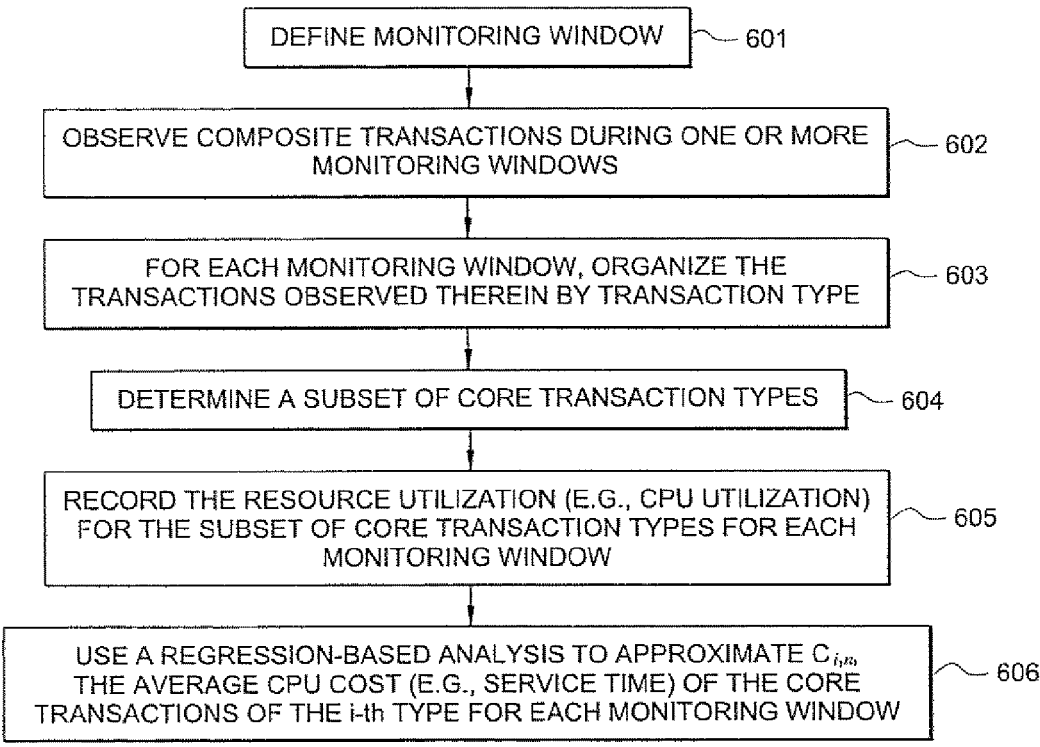

CAPACITY PLANNING FOR COMPUTING SYSTEMS HOSTING MULTI-TIER APPLICATION BASED ON THINK TIME VALUE AND RESOURCE COST OF COMPOSITE TRANSACTION USING STATISTICAL REGRESSION ANALYSIS

CROSS-REFERENCE TO RELATED APPLICATIONS

This application is related to concurrently filed and commonly assigned U.S. patent application Ser. No. 11/684,563, now issued U.S. Pat. No. 8,032,585, entitled "REGRESSION-BASED SYSTEM AND METHOD FOR DETERMINING RESOURCE COSTS FOR COMPOSITE TRANSACTIONS", and concurrently filed and commonly assigned U.S. patent application Ser. No. 11/684,567, now issued U.S. Pat. No. 7,779,127, entitled "SYSTEM AND METHOD FOR DETERMINING A SUBSET OF TRANSACTIONS OF A COMPUTING SYSTEM FOR USE IN DETERMINING RESOURCE COSTS", the disclosures of which are hereby incorporated herein by reference.

TECHNICAL FIELD

The following description relates generally to capacity planning for computer systems, and more particularly to systems and methods for receiving a representative workload of a computing system, determining resource costs for serving transactions included in the representative workload, and using the resource costs for performing capacity planning analysis for the computing system.

DESCRIPTION OF RELATED ART

Today, computer systems are delivering (e.g., via computer networks, such as the Internet) a large array of business, government, and personal services. Similarly, mission critical operations, related to scientific instrumentation, military operations, and health services, are making increasing use of computer systems and computer networks for delivering information and distributed coordination. For example, many users are accessing service providers' computer systems via the Internet seeking such services as personal shopping, airline reservations, rental car reservations, hotel reservations, on-line auctions, on-line banking, stock market trading, as well as many other services being offered by service providers via computer networks, such as the Internet. Therefore, many service providers are competing in such electronic forum. Accordingly, it is important for such service providers (sometimes referred to as "content providers") to provide high-quality services. To do so, it has become desirable for such service providers to perform appropriate capacity planning to ensure that they can adequately service the demands placed on their systems by their clients in a desired manner (e.g., provide responses to requests in sufficiently fast time, etc., such as by serving responsive web pages to a requesting client within 8 seconds and/or satisfy some other quality of service target).

As information technology ("IT") and application infrastructures, such as those employed by the above-mentioned service providers for serving their clients, have become more complex, predicting and controlling the issues surrounding system performance and capacity planning have become a difficult (and sometimes overwhelming) task to many organizations. For larger IT projects, it is not uncommon for the cost factors related to performance tuning, performance management, and capacity planning to result in the largest and least controlled expense. Application performance issues have an immediate impact on customer satisfaction. A sudden slowdown of an enterprise-wide application can affect a large population of customers, can lead to delayed projects, and ultimately can result in company financial loss.

Large-scale enterprise development projects are increasingly relying on Service-Oriented Architecture (SOA) design. This approach provides a collection of mechanisms and interfaces for a dynamic enterprise IT environment to connect applications where the classic, data-processing legacy systems can be integrated with agile web-based front-end applications. Application servers have emerged to provide a standardized platform for developing and deploying scalable enterprise systems. The application servers are often considered a core component of an enterprise system and an integral part of a new trend toward building SOAs.

Multi-tier architectures are also commonly being employed. For instance, the three-tier architecture paradigm has become an industry standard for building scalable client-server applications. In a typical three-tier architecture for an application, the application comprises the following three tiers: 1) an interface tier (sometimes referred to as the presentation tier), 2) an application tier (sometimes referred to as the logic or business logic tier), and 3) a data tier (e.g., database tier). The first tier provides a user interface, such as a graphical user interface (GUI), with which the user may interact with the other tiers. The second tier provides functional process logic, which may comprise one or more separate modules running on a workstation or application server, for example. The application tier may, in some implementations, be multi-tiered itself (in which case the overall architecture may be called an "n-tier architecture"). The third tier manages the storage and access of data for the application. Typically, a relational database management system (RDBMS) on a database server or mainframe contains the data storage logic of the third tier. The three tiers are developed and maintained as independent modules, often on separate platforms. Quite often the first and second tiers may be implemented on common hardware (i.e., on a common platform), while the third tier is implemented on a separate platform, but any arrangement of the three tiers (i.e., either on common hardware or across separate hardware) may be employed in a given implementation. The three-tier architecture is generally intended to allow any of the three tiers to be upgraded or replaced independently as requirements, desires, and/or technology change. For example, a change of operating, system from Microsoft Windows™ to Unix™ may only affect the user interface code.

As an example, suppose that a service provider develops a web application that provides banking services to clients via the web. In this example, the banking application may comprise a user interface tier that defines the user interface with which the clients interact to perform desired banking transactions. The banking application may further comprise an application tier that defines the business logic and functionality of the banking application. The banking application may further comprise a data tier that is operable to manage access of the clients' respective account balance data, for example. In such multi-tiered systems, frequent calls to application servers and data storage (e.g., databases) may place a heavy load on these resources and may cause throughput bottlenecks and high server-wide processing latency.

Traditionally, preliminary system capacity estimates are performed for service provider systems by using synthetic workload or benchmarks which are created to reflect a "typical application behavior" for "typical client requests". While this performance evaluation approach can be useful at the initial stages of design and development of a future system, it is often inadequate for answering more specific questions about an existing system that is deployed in a service provider's environment. In many cases, the workload actually encountered by a deployed system does not correspond with the synthetic workload that was expected for the system, and thus the preliminary system capacity estimates may be inadequate. Further, the techniques used for arriving at the preliminary system capacity estimates are unable to answer specific capacity planning questions that a given service provider may have about the capacity of the deployed system. Further still, evaluating the capacity of a deployed system based on a representative workload of the deployed system, such as an actual historical workload encountered by the deployed system, may be difficult and/or compute-intensive, particularly when the representative workload includes composite transactions. In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. Determining a resource cost associated with serving such composite transactions may be desired for evaluating capacity of a computing system, but techniques for so determining such resource costs, particularly in a manner that is not compute prohibitive, are lacking in traditional capacity planning systems.

BRIEF DESCRIPTION OF THE DRAWINGS

FIG. 5 shows another exemplary system according to an embodiment of the present invention, which analyzes capacity of each tier of at least one multi-tier application hosted by a computing system under analysis;

FIG. 6 shows an operational flow of an exemplary statistical regression-based analysis according to one embodiment of the present invention;

DETAILED DESCRIPTION

Figure 1:
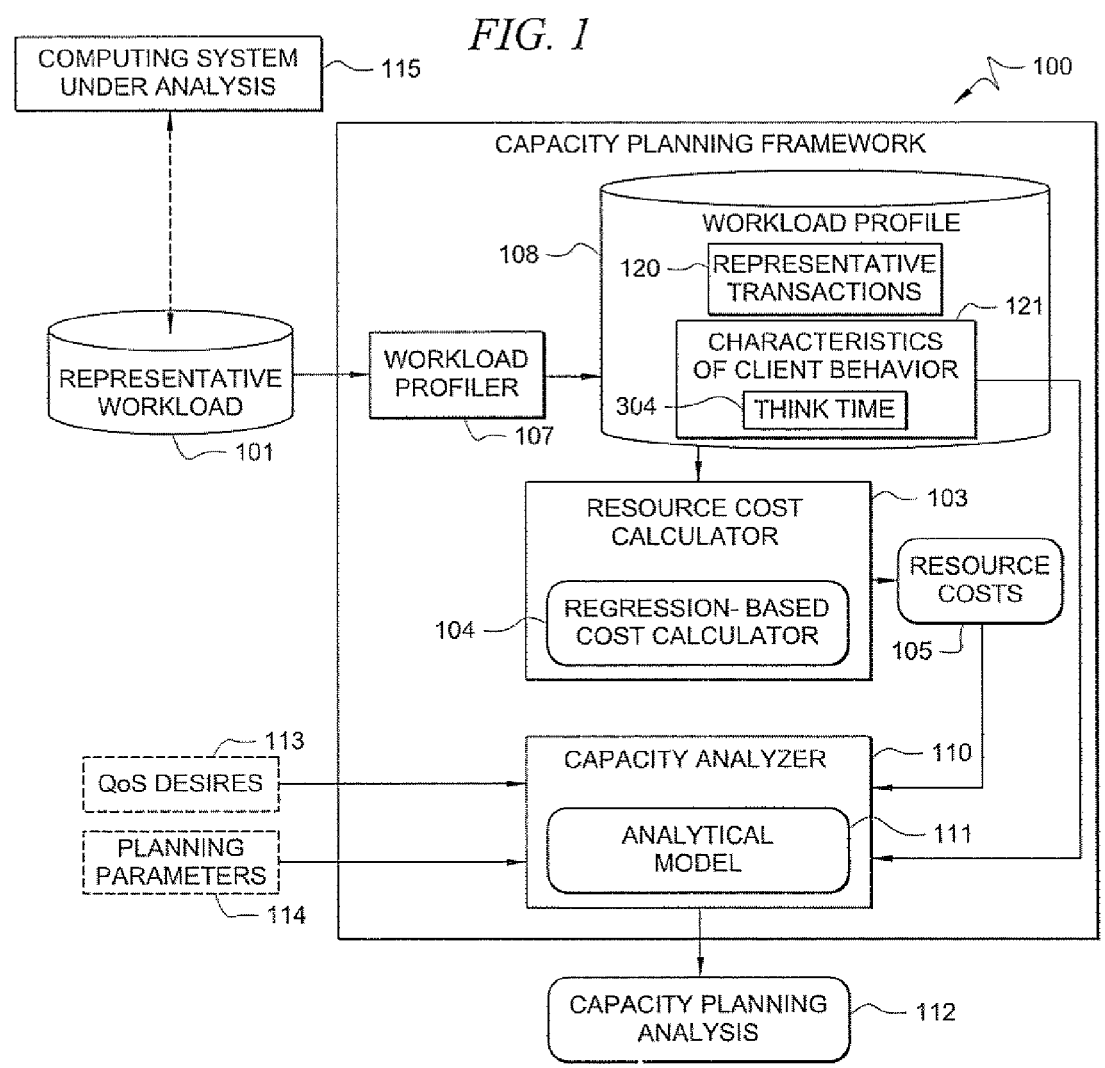
FIG. 1 shows an exemplary system according to an embodiment of the present invention.

Various embodiments of the present invention are now described with reference to the above figures, wherein like reference numerals represent like parts throughout the several views. As described further below, the present invention provides systems and methods for capacity planning for computing systems. According to certain embodiments, an exemplary capacity planning framework is provided that is operable to receive a representative workload of a computing system, determine resource costs for serving transactions included in the representative workload, and use the determined resource costs for performing capacity planning analysis for the computing system. As described further herein, such capacity planning analysis may indicate how many clients that act in a fashion consistent with the client activities reflected in the representative workload the computing system can support in a desired manner (e.g., provide responses to requests in sufficiently fast time, etc., such as by serving responsive web pages to a requesting client within 8 seconds, and/or satisfy some other quality of service target).

According to one embodiment, a capacity planning framework is provided that comprises a workload profiler, a resource cost calculator, and a capacity analyzer. The workload profiler may receive a representative workload and determine a workload profile that is used by the resource cost calculator. The representative workload may, in some embodiments, be data representing an actual historical workload encountered by the system under analysis. Thus, embodiments of the present invention may be employed to analyze a "live" workload of a deployed system, which may enable more accurate analysis and planning for the system beyond the traditional preliminary system capacity estimates mentioned above. In certain embodiments, the workload profiler extracts a set of most popular transactions, referred to herein as core transactions, that are used to characterize the overall workload of the computing system under analysis. Thus, the workload profiler may determine a subset of the transactions present in the representative workload, wherein such subset are the most popular transactions (i.e., that are encountered most frequently in the representative workload).

In certain embodiments, the representative workload comprises a plurality of composite transactions, and the workload profiler determines those composite transactions to supply to the resource cost calculator. For instance, in certain embodiments, the workload profiler determines the most popular composite transaction types included in the representative workload, and supplies the composite transactions of the determined most popular types to the resource cost calculator. Thus, according to such embodiments, the workload profiler exploits locality (such as is commonly present in existing enterprise web workloads) and extracts a small set of most popular, core client transactions responsible for the majority of client requests in the system. Various techniques may be employed by workload profiler for determining a subset of composite transactions to supply to the resource cost calculator such as those techniques employed by the exemplary workload profiler described in co-pending and commonly assigned U.S. patent application Ser. No. 11/684,567, now issued U.S. Pat. No. 7,779,127, entitled "SYSTEM AND METHOD FOR DETERMINING A SUBSET OF TRANS- ACTIONS OF A COMPUTING SYSTEM FOR USE IN DETERMINING RESOURCE COSTS", the disclosure of which is incorporated herein by reference.

Various information about client behavior in performing different types of transactions reflected in the representative workload may be determined by the workload profiler. That is, client activities (or "behavior") encountered by a computing system that is under analysis are characterized by the workload profiler in certain embodiments. For instance, in certain embodiments, the workload profiler determines a "think time" value, which represents system idle time between different composite transactions of a session. As discussed further below, a session generally refers to a plurality of related composite transactions that are typically preferred as a group to provide a desired service to a client. For instance, a session for purchasing an item from a retailer's website may include various composite transactions, such as composite transactions for searching for and selecting a desired item to purchase, establishing shipping information regarding how to ship the purchased item, establishing payment information regarding how to pay for the purchased item, etc. Sessions may be determined by the workload profiler in any suitable manner, such as by using the session IDs included in an access log collected for the computing system under analysis. Between the various composite transactions that make up such a session, there typically exists some amount of system idle time, e.g., while the client is reviewing previously-presented information, determining which transaction to initiate next and/or how to initiate such transaction, etc. Such system idle time during a given session is referred to herein as "think time". Such think time (or system idle time) may differ from one type of session to the next. For instance, sessions in which clients select and purchase items from a retailer may have different think time values than sessions in which clients receive some other type of service, such as applying for a loan from a banking application, etc. In other words, the client behavior in interacting with different types of applications and/or in receiving different types of services may differ, and thus the think time value may be determined for various different types of sessions to reflect the typical client behavior for each respective type of session.

The determined "think time" value may further be taken into consideration in analyzing the capacity of the computing system under analysis, as discussed further herein. As mentioned above, such client activities as think time may vary from one computing system and/or application to another. By determining characteristics of such client activity for a given computing system under analysis and taking those characteristics into account in the capacity planning analysis, an accurate capacity analysis can be intelligently determined for the computing system. Further, in this manner, such capacity analysis is individualized for the given computing system under analysis and its respective representative workload and client activity characteristics.

The workload profile in information determined by the workload profiler is received by a resource cost calculator. The resource cost calculator is operable to determine resource costs of the computing system for serving the transactions reflected in the received workload profile. As described further below, such resource costs reflect an amount of utilization of at least one resource (e.g., CPU utilization) of the computing system for serving a corresponding transaction. Again, in certain embodiments, the received workload comprises composite transactions, and the resource cost calculator computes a corresponding resource cost for serving such composite transactions. According to certain embodiments, a regression-based system and method is employed by the resource cost calculator for determining resource costs associated with serving the composite transactions received from the workload profiler, such as the exemplary regression-based systems and methods described in co-pending and commonly assigned U.S. patent application Ser. No. 11/684,563, now issued U.S. Pat. No. 8,032,585, entitled "REGRESSION-BASED SYSTEM AND METHOD FOR DETERMINING RESOURCE COSTS FOR COMPOSITE TRANSACTIONS", the disclosure of which is incorporated herein by reference.

The determined resource costs of the received workload are supplied to a capacity analyzer which uses the resource costs for performing capacity analysis of the computing system. Thus, in certain embodiments, the determined resource costs are analyzed by the capacity analyzer for performing planning, such as for answering capacity planning questions about the computing system under analysis. For example, in certain embodiments the capacity analyzer determines, based at least in part on the resource costs determined by the resource cost calculator, the capacity of the computing system for serving an increased population of clients that act similar to the system's current population of clients, etc. Accordingly, in certain embodiments, the determined cost functions may be used for evaluating the resource requirement of a scaled or modified transaction workload mix in order to accurately size the future system, for example.

Further, in certain embodiments, the resource costs may be determined for different tiers of a multi-tier architecture. For instance, the computing system under analysis may host one or more multi-tier applications thereon. For example, the transactions included in the representative workload may be transactions of one or more multi-tier applications hosted by the computing system under analysis. Thus, exemplary embodiments are disclosed that enable a resource cost (e.g., CPU cost) of different client transactions at different tiers to be determined (e.g., approximated). Further, in certain embodiments, the resource costs determined for the different tiers are used by the capacity analyzer to determine the computing system's capacity for serving a workload with similar characteristics as the representative workload at each of the different tiers. Thus, the capacity of the computing system at the various different tiers of the one or more multi-tier applications hosted by the computing system may be determined by the capacity analyzer, as discussed further herein. In one embodiment, the capacity analyzer employs an analytical model that is based on a network of queues representing different tiers of the multi-tier application. As a result, a system administrator may be informed that, as a simplified example, an interface tier of a multi-tier application can adequately support 1500 clients during a time period under analysis (i.e., while satisfying QoS goals), while an application tier can support 750 clients and a data tier can support 1300 clients. In this manner, the administrator may determine that adding computing resources to the application tier may be a most effective way to increase the multi-tier application's capacity.

Often, a service provider desires to answer such capacity planning questions as:

a) how many additional clients can be supported by the existing system i) while still providing the same performance guarantees, e.g. response time under 8 sec., and ii) assuming that new clients perform similar activities as already existing clients in the system, i.e., the system processes the same type of workload?

b) does the existing system have enough available capacity for processing an additional service for N number of clients where the client activities and behaviors are specified as a well-defined subset of the current system activities?

c) if the current client population doubles, then what is the expected system response time?

Certain embodiments of the present invention may be employed to intelligently answer one or more of these questions for a service provider and/or provide other capacity planning analysis, as discussed further herein.

As discussed further below, according to one embodiment, a capacity planning framework is provided that includes a workload profiler that receives a representative workload of a computing system under analysis. The workload profiler determines a workload profile of the computing system that reflects a transaction mix that varies over time. For instance, the workload profile may identify composite transactions that are encountered during each of a plurality of monitoring windows (time periods). The composite transactions may vary from one monitoring window to the next. That is, the mix of composite transactions may vary across the monitoring windows. In certain embodiments, the workload profile includes a subset of composite transactions from the representative workload. Further, in certain embodiments, the workload profile identifies for each type of composite transaction, a percentage or fraction of the composite transactions of the corresponding type to the overall composite transactions. For instance, for a given monitoring window, the workload profile may contain for each type of composite transaction encountered in the window a ratio of the number of composite transactions of such type to the overall composite transactions encountered in the monitoring window.

In certain embodiments, the workload profiler determines at least one session in the representative workload, wherein the session comprises a plurality of related composite transactions for providing a service to a client. Thus, time number of such sessions may, in some embodiments, represent the number of clients supported by the computing system under analysis. In certain embodiments, the workload profiler also determines a think time value reflecting idle time of the computing system between the plurality of composite transactions for the at least one session. And, in certain embodiments, a resource cost calculator computes resource costs for at least a subset of the composite transactions, wherein such resource costs may be computing using a regression-based analysis, as discussed further herein.

In certain embodiments, the capacity planning framework further includes a capacity analyzer that receives the determined workload profile, and determines a maximum capacity of the computing system under analysis for serving the workload profile while satisfying a defined quality of service (QoS) target. In certain embodiments, the capacity analyzer receives the determined resource costs and think time value, and determines, based at least in part on the determined resource costs and think time value, a maximum capacity of the computing system under analysis for serving the workload profile (for the transaction mix that varies over time) while satisfying the defined quality of service (QoS) target. For instance, in certain embodiments, the capacity analyzer determines a maximum number of clients that can be served by the computing system under analysis while satisfying said defined QoS target. The maximum number of clients may be a maximum number of clients that the computing system can serve within a defined time interval in compliance with said defined QoS target, such as a maximum number of clients that the computing system can serve within a given time window or concurrently. The defined QoS target may be a defined maximum response time for said computing system to respond to a client request, and/or some other QoS metric.

As discussed further below, a traditional Mean-Value Analysis (MVA) algorithm may be used for receiving a number of clients "N" as input and computing the average performance metrics for a system having N clients. According to certain embodiments of the present invention, a modified MVA algorithm is provided that is operable to determine a maximum capacity of a system (e.g., maximum number of clients supportable by the system) while satisfying a defined QoS target (e.g., while the average transaction response time does not exceed a defined threshold). In this manner, rather than receiving the number of clients N as input and merely computing average performing metrics for a system with N clients (as in the traditional MVA algorithm), the modified MVA algorithm may be employed to determine the maximum number of clients that the system can support with the average performance metrics satisfying a defined QoS target. Further) the traditional MVA algorithm assumes that the transaction mix of the computing system under analysis remains stationary. Embodiments of the present invention may employ the modified MVA algorithm to analyze the capacity of the computing system under a varying transaction mix over time. For instance, the modified MVA algorithm computes the average service time (resource costs) for a transaction mix observed at each monitoring window, and this computation is repeated for a plurality of monitoring windows in a trace. In this way, the modified MVA algorithm may be employed to determine the system capacity under a real live workload that was encountered by the computing system under analysis, wherein such workload comprises a mix of transactions that vary over time (e.g., from one monitoring, window to the next).

FIG. 1 shows an exemplary system 100 according to an embodiment of the present invention. As shown in this example, a representative workload 101 of a computing system 115 that is under analysis is received by capacity planning framework 106. As described further below, in this example, capacity planning framework 106 comprises workload profiler 107, resource cost calculator 103, and capacity analyzer 110. Workload profiler 107 receives representative workload 101 and determines a workload profile 108. As discussed further herein, in certain embodiments, the workload profile 108 comprises representative transactions (e.g., composite transactions) 120 and data 121 representing characteristics of behavior client behavior reflected in the representative workload 1015 such as think time 304. Resource cost calculator 103 receives the workload profile 108 and determines resource costs 105 for the transactions included in such workload profile. Then, capacity analyzer 110 receives the determined resource costs 105 and client behavior characteristics 121 (e.g., think time 304) and uses this information to perform capacity planning analysis for the computing system 115 that is tinder analysis.

Thus, as described further below, by analyzing a representative workload 101 and the corresponding resource costs 105 and client behavior characteristics 121 (e.g., think time 304) of the computing system 115 for the representative workload 101 (or some portion thereof, such as those transactions included in workload profile 108), capacity analyzer 110 can determine the capacity of computing system 115, such as determining how many clients computing system 115 can support according to a desired quality of service target 113 if the such clients act consistent with those represented by representative workload 111. Such a capacity analysis can be output as analysis 112, and used by a planner to determine future planning as to computing resources to be added to computing system 115 to enable the service provider to support a growing workload (e.g., a growing number of clients to support).

In the exemplary embodiment of FIG. 1, representative workload 101 may be an actual historical workload collected for a service provider (referred to herein as a "live workload"), for example. That is, representative workload 101 may comprise data representing an actual historical workload collected for system 115 under analysis over a given period of time, say a preceding 3-month period for example. Representative workload 101 may comprise data stored to a computer-readable medium, such as memory, hard drive, peripheral data storage drive, optical data storage (e.g., CD, DVD, etc.), magnetic data storage, tape storage, etc. Representative workload 101 may be stored in the fan of any suitable data structure, such as to a database, file, table, etc. Again, in certain embodiments, such data may represent an actual historical workload of the service provider's computing system 115.

The representative workload data 101 may be collected through well-known application logs and system usage metrics, such as CPU utilization measured at a defined time scale (e.g., 5 minutes or so). As one example, the data collected in access logs generated by Hewlett-Packard's Open View Service Desk (OVSD) application server may be used in forming representative workload 101. Other types of access logs, which may be customized for their respective applications, may be used for collecting a live workload in accordance with embodiments of the present invention. As an illustrative example, such access logs typically collect such data as the following for each transaction: date and a time stamp of the request, session ID, transaction URL, and referrer field. According to one embodiment of the present invention, the timestamp, session ID, and transaction URL fields of the access log are used for the analysis.

In this example, capacity planning framework 106 comprises a workload profiler 107, which receives representative workload 101 and determines a workload profile 108 for computing system 115. Such workload profile 108 is determined as an appropriate workload profile 108 of computing system 115 to input to resource cost calculator 103. For instance, as described further herein, in certain embodiments workload profiler 107 determines a subset of transactions that are included in representative workload 101 to form representative transactions 120 of workload profile 108. Thus, in certain embodiments, workload profile 108 comprises a subset of the transactions that are included in representative workload 101, which are determined by workload profiler 107 to be characteristic of the client activities encountered by computing system 115 such that the subset of transactions (as opposed to the full representative workload 101) can be used for accurately performing capacity planning. For example, the workload profile 108 may comprise the "K" most popular transactions of representative workload 101 in representative transactions 120. Thus, according to one embodiment, workload profiler 107 extracts a set of most popular client transactions, called core transactions, to characterize the overall site workload and the most popular client sessions at the site. As described further herein, various client behavior characteristics 121, such as think time 304, are also determined by workload profiler 107 and included in workload profile 108. Once determined, workload profile 108 may be stored to a computer-readable mediums such as memory, hard drive, peripheral data storage drive, optical data storage (e.g., CD, DVD, etc.), magnetic data storage, tape storage, etc. The workload profile 108 and/or data about transactions included therein may be stored in the form of any suitable data structure, such as to a database, file, table, etc.

As discussed further herein, in certain embodiments, the representative workload 101 comprises composite transactions, and workload profiler 107 determines the appropriate ones of such composite transactions to include in the representative transactions 120 of workload profile 108. For instance, the most popular types of composite transactions in the representative workload 101 may be determined by workload profiler 107, and the composite transactions (in the representative workload 101) of the "K" most popular composite transaction types may be determined as appropriate to form representative transactions 120 of workload profile 108. Exemplary composite transactions that may be included are described further below with reference to FIG. 4.

Exemplary capacity planning framework 106 further comprises a resource cost calculator 103, which receives the determined representative transactions 120 of workload profile 108. Such resource cost calculator 103 is operable to analyze the received representative transactions 120 and determine a corresponding resource "cost" 105 for each of the transactions included therein. In general, the resource cost of a transaction reflects an amount of utilization of at least one resource in serving the transaction. For example, the resource cost that is computed in certain embodiments is a CPU cost, which is reflective of an amount of CPU utilization attributable to serving the corresponding transaction. In certain embodiments, such CPU utilization may be a corresponding amount of CPU utilization of a given tier of multi-tier architecture that is attributable to serving the corresponding transaction. As discussed further herein, in certain embodiments, the representative transactions 120 included in workload profile 108 comprises one or more composite transactions, and resource cost calculator 103 computes the corresponding resource cost 105 for each of such composite transactions. Thus, resource cost calculator 103 may be referred to as a composite transaction resource cost calculator ("CTRCC").

In certain embodiments, workload profiler 107 may periodically receive a representative workload 101 for a service provider and determine the workload profile 108 of most popular transactions (e.g., composite transactions) contained within the representative workload 101; and resource cost calculator 103 may receive such determined representative transactions 120 of workload profile 108 to determine the resource costs 105 for such transactions. For instance, representative workload 101 may, in some embodiments, be a historical workload encountered by the service provider's system 115 (e.g., over the preceding 3-month period), and workload profiler 107 and resource cost calculator 103 may therefore provide an updated analysis over time as the number of clients supported by the service provider and/or the client activities may change over time.

As described further herein, in certain embodiments, resource cost calculator 103 employs a regression-based solver 104 for determining the resource cost 105 for the transactions (e.g., composite transactions) 120 of workload profile 108. According to certain embodiments, such a regression-based solver 104 may determine resource costs 105 in the manner described in co-pending and commonly assigned U.S. patent application Ser. No. 11/684,563, now issued U.S. Pat. No. 8,032,585, entitled "REGRESSION-BASED SYSTEM AND METHOD FOR DETERMINING RESOURCE COSTS FOR COMPOSITE TRANSACTIONS", the disclosure of which is incorporated herein by reference.

An exemplary statistical regression-based analysis that may be employed by such regression-based solver 104 is described further below in connection with FIG. 6. According to one embodiment, regression-based solver 104 uses statistical regression to approximate the resource cost (e.g., CPU demand) of each core transaction on a given hardware. Thus, in certain embodiments, a real (live) workload mix can be directly mapped onto the corresponding computing system's resource (e.g., CPU) demand requirements for serving such workload mix.

As mentioned above, representative workload 101 and/or workload profile 108 may comprise composite transactions 120, and resource cost calculator 103 may determine the corresponding resource costs 105 for such composite transactions. In certain embodiments, the representative workload 101 and/or workload profile 108 may comprise certain transactions that are not composite transactions, and resource cost calculator 103 may also be operable to determine a resource cost for such non-composite transactions.

Exemplary capacity planning framework 106 further comprises capacity analyzer 110, which receives the determined resource costs 105 and uses such resource costs 105 for performing capacity analysis of the computing system 115. Thus, in certain embodiments, the determined resource costs 105 are analyzed by the capacity analyzer 110 for providing a capacity planning analysis 112 of computing system 115, such as for answering capacity planning questions about the computing system 115. For example, in certain embodiments the capacity analyzer 110 determines, based at least in part on the resource costs 105 determined by the resource cost calculator 103, the capacity of the computing system 1115 for serving an increased population of clients that act similar to the system's current population of clients, etc.

Capacity analyzer 110 further receives the determined client behavior characteristics 121, such as think time 304, and further uses this information for intelligently perform capacity analysis of the computing system 115. Accordingly, as discussed further herein, such client behavior characteristics 121 as think time 304 for a computing system under analysis can be taken into account to provide greater accuracy of the capacity analysis rendered by capacity analyzer 110 for the given computing system that is under analysis and its respective client base.

In certain embodiments, capacity analyzer 110 uses an analytical model 111 for capacity planning of multi-tier applications hosted by computing system 115 with session-based workloads, as discussed further herein. Such an analytical model 111 may be based on a network of queues, where the queues represent different tiers of the application. As such, in certain embodiments, the capacity of each tier of a multi-tier application hosted by computing system 115 may be determined by capacity analyzer 110.

In certain embodiments, capacity analyzer 110 may also receive input (e.g., from a user) indicating QoS desires 113. Such QoS desires 113 may specify, for example, a target QoS that is desired to be provided by the service provider, such as serving web pages to clients with response times no longer than 8 seconds. Capacity analyzer 110 may, in certain embodiments, also receive certain planning parameters 114, which may specify a desired modification to the workload of the service provider. For instance, planning parameter 114 may specify an additional number of clients desired to be supported by the service provider, or may pose certain capacity planning questions desired to be answered for a service provider. In this manner, the capacity analyzer 110 may analyze the received resource costs 105 to answer such capacity planning questions that a service provider may have as:

how many additional clients can be supported by the existing system i) while still providing the same performance guarantees (QoS desires 502), e.g., response time under 8 seconds, and ii) assuming that new clients perform similar activities as already existing clients in the system, i.e., the system processes the same type of workload?

does the existing system have enough available capacity for processing an additional service for N number of clients (defined by planning parameters 503) where the client activities and behaviors are specified as a well-defined subset of the current system activities?

if the current client population doubles, then what is the expected system response time?

The answers to such questions and/or other capacity planning information may be determined by capacity analyzer 110 and output as capacity planning analysis 112.

Various elements of capacity planning framework 106, such as workload profiler 107, resource cost calculator 103 (and/or regression-based solver 104), and capacity analyzer 110 (and/or analytical model 111) may be implemented as computer-executable software code stored to a computer-readable medium and/or as hardware logic, as examples. Once determined, workload profile 108, resource costs 105, and/or capacity planning analysis 112 may be stored to a computer-readable medium, such as memory, hard drive, peripheral data storage drive, optical data storage (e.g., CD, DVD, etc.), magnetic data storage, tape storage, etc. The workload profile 108, resource costs 105, and/or capacity planning analysis 112 may each be stored in the form of any suitable data structure, such as to a database, file, table, etc.

Figure 2:
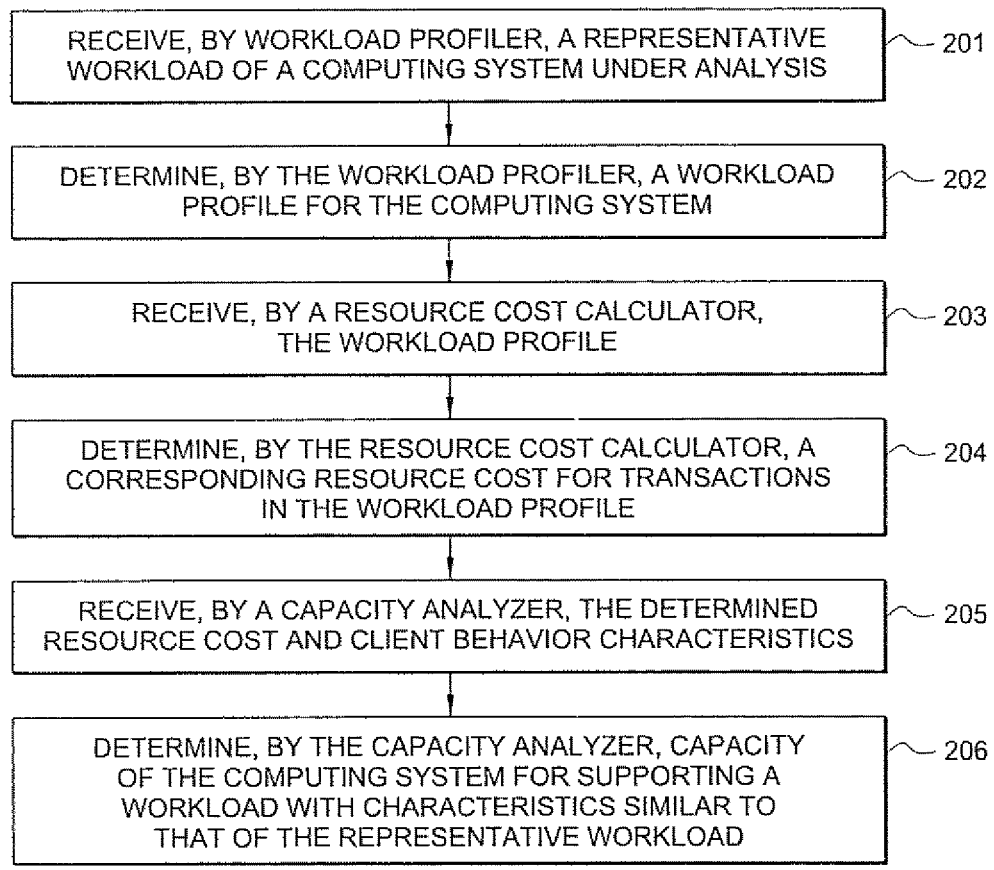
FIG. 2 shows an exemplary operational flow according to an embodiment of the present invention.

FIG. 2 shows an exemplary operational flow diagram of capacity planning framework 106 according to one embodiment of the present invention. In operational block 201, workload profiler 107 receives representative workload 101 of computing system 115 that is under analysis. In block 202, workload profiler 107 determines a workload profile 108 for the computing system 115. As described further herein, in certain embodiments, the workload profile 108 includes a subset of the transactions 120 present in representative workload 101 (e.g., the most popular transactions in the representative workload 101), as well as client behavior characteristics 121, such as client think time 304. In block 203, resource cost calculator 103 receives the determined workload profile 108, and in block 204, the resource cost calculator 103 determines a corresponding resource cost 105 for the transactions 120 in the workload profile 108.

In block 205, capacity analyzer 110 receives the determined resource costs 105 and the determined client behavior characteristics 121 (e.g., think time 304). In block 206, capacity analyzer 110 determines capacity 112 of the computing system 115 for supporting a workload with characteristics similar to that of the representative workload 101. For instance, in certain embodiments, capacity analyzer 110 determines how many clients that act consistent with the clients reflected in representative workload 101 that computing system 115 can support in a manner consistent with desired quality of service (QoS) goals 113.

Figure 3:
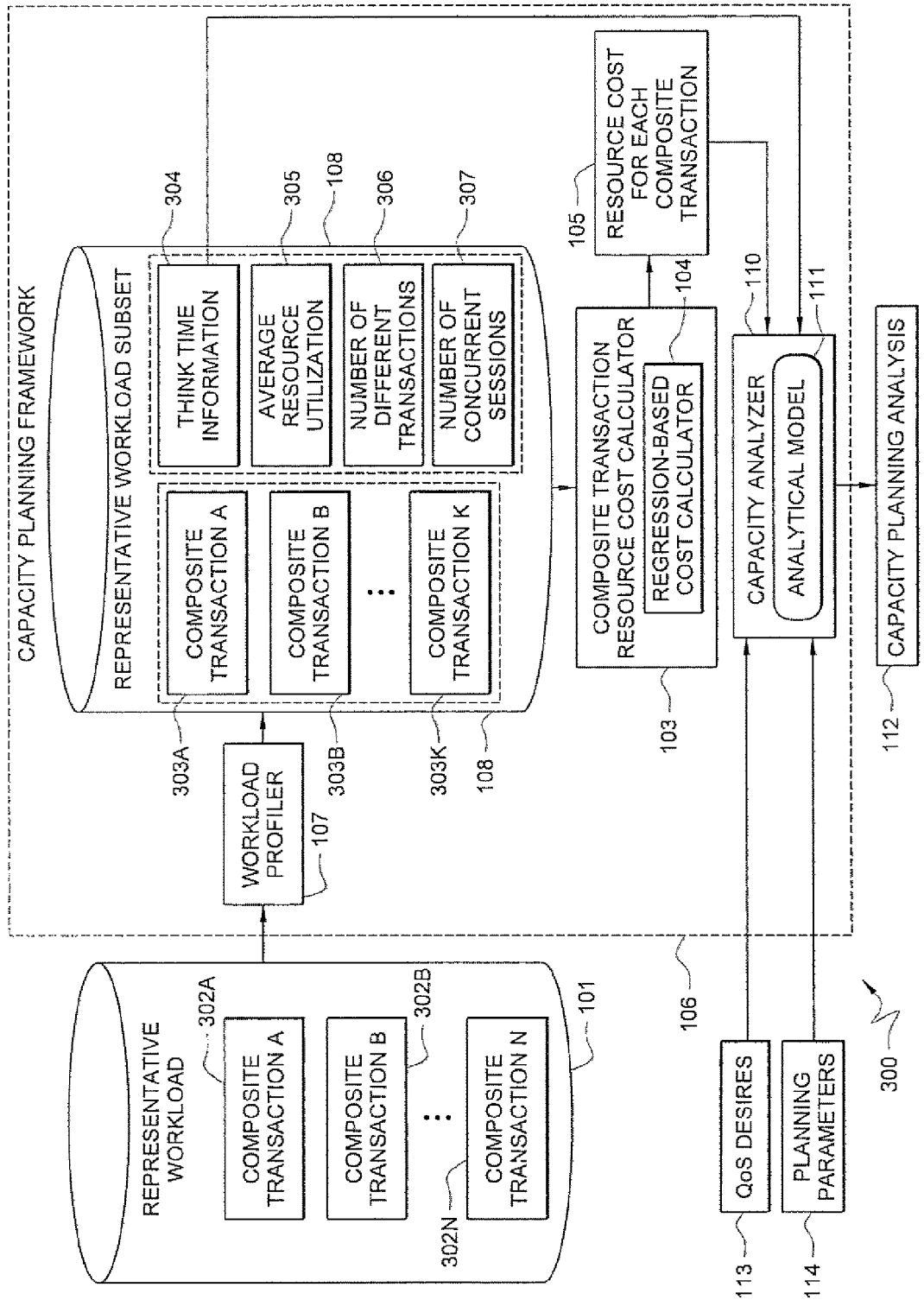
FIG. 3 shows another exemplary system according, to an embodiment of the present invention.

FIG. 3 shows another exemplary system 300 according to an embodiment of the present invention. As shown in this example, a representative workload 101 comprises a plurality of composite transactions, such as composite transactions 302A-302N (referred to collectively herein as composite transactions 302). In general, a composite transaction refers to a transaction that comprises a plurality of transactions. For instance, a given transaction for serving a client's request for information (e.g., a web page) may include embedded therein a plurality of requests/responses for objects (e.g., images, etc.) that form the information (e.g., that form the requested web page), and thus the given transaction for serving the information may be considered a composite transaction as it involves various transactions for serving the objects that form such information. A more detailed example of a composite transaction is described further below with reference to FIG. 4.

As discussed above with FIG. 1 representative workload 101 may be an actual historical workload collected for a service provider (referred to herein as a "live workload"), for example. That is, representative workload 101 may comprise data representing an actual historical workload collected for a system under analysis over a given period of time, say a preceding 3-month period for example. Representative workload 101 may comprise data stored to a computer-readable medium, such as memory, hard drive, peripheral data storage drive, optical data storage (e.g., CD, DVD, etc.), magnetic data storage, tape storage, etc. Representative workload 101 may be stored in the form of any suitable data structure, such as to a database, file, table, etc.

In this exemplary system 300, workload profiler 107 receives representative workload 101 and determines a workload profile 108 that comprises a subset (e.g. subset 120) of the composite transactions included in representative workload 101. That is, workload profiler 107 employs techniques, such as those described further in concurrently filed and commonly assigned U.S. patent application Ser. No. 11/684,567, now issued U.S. Pat. No. 7,779,127, entitled "SYSTEM AND METHOD FOR DETERMINING A SUBSET OF TRANSACTIONS OF A COMPUTING SYSTEM FOR USE IN DETERMINING RESOURCE COSTS" (the disclosure of which is incorporated herein by reference), to determine a subset of the "K" most popular composite transactions 303A-303K (referred to collectively herein as composite transactions 303) of representative workload 101.

As described further herein, in certain embodiments various information characterizing the representative workload 101 and/or client activities reflected therein may be determined by workload profiler 107 and included in workload profile 108 as client behavior characteristics 121. For instance, in certain embodiments think time information 304 is also determined by workload profiler 107. In general, the think time information 304 indicates the amount of system idle time between different transactions of a "session." The notion of a "session" is described further below, and generally refers to a plurality of related composite transactions that are typically performed as a group. For instance, a session for purchasing an item from a retailer's website may include various composite transactions, such as composite transactions for searching for and selecting a desired item to purchase, establishing shipping information regarding how to ship the purchased item, establishing) payment information regarding how to pay for the purchased item, etc. Between each composite transaction of a session there may exist system idle time, referred to as "think time", during which the client may be reviewing output information from a previous composite information and/or deciding whether and how best to proceed to a next composite transaction of the session, as examples. Such think time information 304 and exemplary techniques for determining it are described further herein.

Additionally, average resource utilization (e.g., average CPU utilization) 305 during a given monitoring window of time over which the representative workload 101 is collected may be determined by workload profiler 107, as well as the number of different transactions 306 observed during such monitoring window. Further, the number of concurrent sessions 307 observed during the monitoring window may also be determined by workload profiler 107.

The various metrics 304-307 may be collected for each time window of, say, 1 hour, which may be a tunable tool parameter, and per each machine of computing system 115.

As discussed further below, such metrics 304-307 are used in the analytical model 111. Thus, for instance, one or more of such metrics 304 are input to capacity analyzer 110, such as think time 304 being shown in FIG. 3 as input to capacity analyzer 110. As discussed further herein, the accuracy of the capacity analysis provided by the capacity analyzer 110 for a given computing system can be enhanced by further taking into account the representative client behavior characteristics 121, such as think time 304, for the given computing system.

Once determined, the subset of composite transactions 303 and/or one or more of characterizing information 304-307 may be stored to a computer-readable medium, such as memory, hard drive, peripheral data storage drive, optical data storage (e.g., CD, DVD, etc.), magnetic data storage, tape storage, etc. The workload profile 108 and/or composite transactions 303 and characterizing information 304-307 thereof may be stored in the form of any suitable data structure, such as to a database, file, table, etc.

In the example of FIG. 3, capacity planning framework 106 further comprises a composite transaction resource cost calculator ("CTRCC") 103, which receives the representative transactions 120 of workload profile 108 (e.g., the subset of composite transactions 303). Such CTRCC 103 is operable to analyze the received representative transactions 120 and determine a corresponding resource "cost" 105 for each of the composite transactions 303. In general, the resource cost of a composite transaction reflects an amount of utilization of at least one resource in serving the composite transaction. For example, the resource cost that is computed in certain embodiments is a CPU cost, which is reflective of an amount of CPU utilization attributable to serving the corresponding composite transaction. In certain embodiments, such CPU utilization may be a corresponding amount of CPU utilization of a given tier of multi-tier architecture that is attributable to serving the corresponding composite transaction.

As described further herein, in certain embodiments, CTRCC 103 employs a regression-based solver 104 for determining the resource cost 105 for the composite transactions 303. An exemplary statistical regression-based analysis that may be employed by such regression-based solver 104 is described further in co-pending and commonly assigned U.S. patent application Ser. No. 11/684,563, now issued U.S. Pat. No. 8,032,585, entitled "REGRESSION-BASED SYSTEM AND METHOD FOR DETERMINING RESOURCE COSTS FOR COMPOSITE TRANSACTIONS", the disclosure of which is incorporated herein by reference.

As described above with FIG. 1, capacity analyzer 110 receives the determined resource costs 105 and one or more of client behavior characteristics 121, such as think time 304' and uses such received information for performing capacity analysis of the computing system 115. Thus, in certain embodiments, the determined resource costs 105 and client behavior characteristics 121 (e.g., think time 304) are analyzed by the capacity analyzer 110 for providing a capacity planning analysis 112 of computing system 115, such as for answering capacity planning questions about the computing system 115. For example, in certain embodiments the capacity analyzer 110 determines the capacity of the computing system 115 for serving an increased population of clients that act similar to the system's current population of clients, etc.

The exemplary regression-based systems and methods described in co-pending and commonly assigned U.S. patent application Ser. No. 11/684,563, now issued U.S. Pat. No. 8,032,585, entitled "REGRESSION-BASED SYSTEM AND METHOD FOR DETERMINING RESOURCE COSTS FOR COMPOSITE TRANSACTIONS" provide techniques for accurately and efficiently determining resource costs associated with various composite transactions included in a representative workload. However, in some instances, the efficiency and/or accuracy of the capacity planning analysis can be improved by focusing the analysis more heavily on a determined subset of most popular composite transactions in the representative workload. For instance, a typical web service and its web site can support hundreds or thousands of distinct web pages and links. Finding a solution for a large number of equations with large number of variables results in a high complexity of regression method and correspondingly a high computing time. Workload analysis has shown the inventors of the present invention that the typical web workload exhibits a very high degree of reference locality, where a relatively small subset of site transactions is responsible for a very high percentage of client accesses. Such reference locality may likewise exist in computing environments other than web service environments, and thus application of the concepts described herein are not limited to web workloads but may be likewise applied in addition or instead to other types of workloads. Thus, certain embodiments of the present invention, such as the exemplary embodiment of FIG. 3, actively exploit the locality available in such workloads to provide an optimized technique for efficiently and accurately determining resource costs for composite transactions, wherein such determined resource costs may in turn be used for performing capacity planning analysis.

In this manner, according to certain embodiments, a subset 120 of the composite transactions included in a representative workload 101 of a service provider's computing system 115 may be determined by workload profiler 107 and used by CTRCC 103 for determining the resource costs 105 associated with serving the composite transactions included in such subset 120. The subset 120 of composite transactions may be identified, for example, as the most popular transactions that are performed in the representative workload 101. For instance, in certain embodiments, a popularity threshold may be defined, wherein such popularity threshold may establish a cutoff for determining the most popular (e.g., the most frequently served) composite transactions in the representative workload. As an example, those composite transactions that make up 90% (or some other threshold amount) of resource utilization of a workload may be determined as the most popular composite transactions. As another example, those transactions that occur most frequently may be determined as the most popular composite transactions. For instance, the composite transactions appearing in the representative workload 101 may be ordered based on frequency of occurrence in the representative workload, and the top 10, 15, 20, 50, 100, and/or other number of most popular composite transactions (or types of composite transactions) may be selected as the most popular subset to use in the further analysis. Thus, the received representative workload 101 may be analyzed by workload profiler 107 to determine those composite transactions that exceed a defined popularity threshold, wherein such composite transactions that exceed the defined popularity threshold form a subset 120 of composite transactions 303A-303K that are used by CTRCC 103 for computing corresponding resource costs 105 associated with each of such subset of composite transactions.

In certain embodiments, it is recognized that rarely-encountered composite transactions included in a representative workload 101 may form a level of "noise" that if taken into consideration for capacity planning may lead to inefficiency and/or inaccurate results. For instance, resource costs of rarely occurring composite transactions may distort the capacity planning analysis to account for such composite transactions when such composite transactions may occur so infrequently that the capacity planning analysis should not be based heavily on the resource costs thereof. Certain embodiments of the present invention recognize that some amount of such "noise" attributable to relatively rarely encountered composite transactions may be present over various periods of analysis. Although, the specific rare transactions that cause such "noise" may differ from one period to the next. For example, in an online banking application, certain composite transaction types such as viewing account balances, performing transfers of amounts between accounts, etc. may be popular transaction types that occur frequently, while other types of composite transactions such as applying for a mortgage, requesting a credit report, etc. may occur much less frequently. Further, in a first monitoring window of time during which the online banking application is analyzed, the most popular transaction account types may be present along with an occurrence of certain rare transaction types, such as a mortgage application in the above example; whereas in a second monitoring window of time, the most popular transaction account types may again be present along wild an occurrence of certain other rare transaction types, such as a request for a credit report in the above example. Accordingly, in certain embodiments, an additional amount of cost is included in the determined resource cost for the subset of composite transactions to account for an amount of additional noise that may likely be encountered during a given period due to some rarely encountered transactions. In this manner, the resource cost determination can be more accurate because it is based heavily on the most popular subset of composite transactions that are likely to be encountered by the computing system, while also permitting an ability to account for a certain amount of additional "noise" that is likely to be encountered due to rarely encountered transactions.

Figure 4:
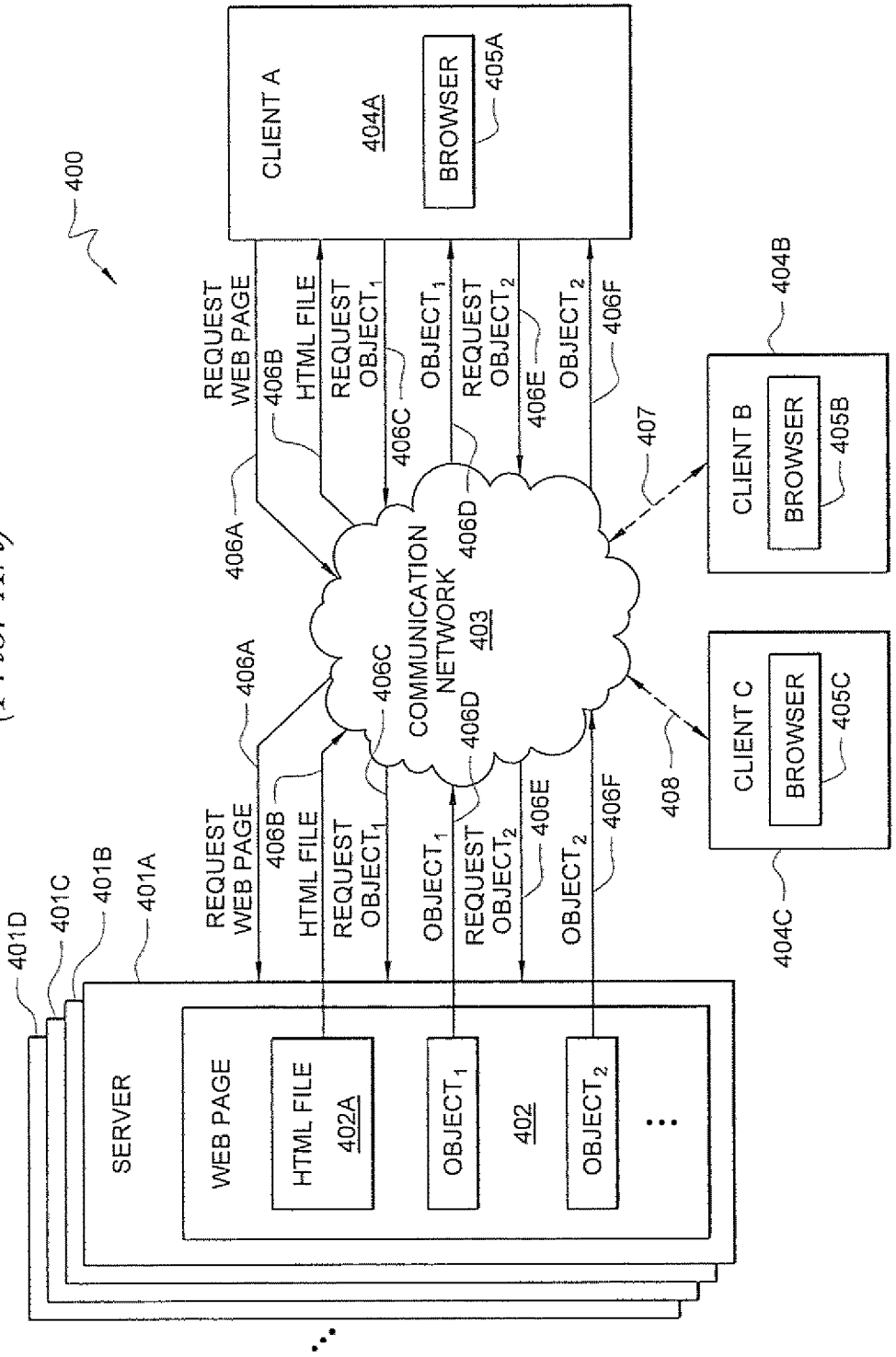
FIG. 4 shows an exemplary client-server system for which embodiments of the present invention may be implemented to analyze.

Turning to FIG. 4, an exemplary client-server system 400 is shown in which certain embodiments of the present invention may be implemented. As shown, one or more servers 401A-401D may provide services (information) to one or more clients, such as clients ARC (labeled 404A-404C, respectively), via communication network 403. Communication network 403 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computers to communicate with each other.

In a preferred embodiment, servers 401A-401D comprise web servers that are utilized to serve up web pages to clients A-C via communication network 403 in a manner as is well known in the art. Accordingly, system 400 of FIG. 4 illustrates an example of servers 401A-401D serving up web pages, such as web page 402, to requesting clients A-C. Of course, embodiments of the present invention are not limited in application to determining resource costs for serving web pages, but may likewise be implemented for determining resource costs for other types of composite transactions. Thus, while various examples are provided herein for determining resource costs for client accesses of web pages, it should be understood that such examples are intended to render the disclosure enabling for determining resource costs associated with various other types of composite transactions.

In the example of FIG. 4, web page 402 comprises an HTML (or other mark-up language) file 402A (which may be referred to herein as a "main page"), and several embedded objects (e.g., images, etc.), such as Object$_1$ and Object$_2$. Techniques for serving up such web page 402 to requesting clients A-C are well known in the art, and therefore such techniques are only briefly described herein. In general, a browser, such as browsers 405A-405C, may be executing at a client computer, such as clients A-C. To retrieve a desired web page 402, the browser issues a series of HTTP requests for all objects of the desired web page. For instance, various client requests and server responses are communicated between client A and server 401A in serving web page 402 to client A, such as requests/responses 406A-406F (referred to collectively herein as requests/responses 406). Requests/responses 406 provide a simplified example of the type of interaction typically involved in serving a desired web page 402 from server 401A to client A. As those of skill in the art will appreciate, requests/responses 406 do not illustrate all interaction that is involved through TCP/IP communication for serving a web page to a client, but rather provides an illustrative example of the general interaction between client A and server 401A in providing web page 402 to client A.

When a client clicks a hypertext link (or otherwise requests a URL) to retrieve a particular web page, the browser first establishes a TCP connection with the web server by sending a SYN packet (not shown in FIG. 4). If the server is ready to process the request, it accepts the connection by sending back a second SYN packet (not shown in FIG. 4) acknowledging the client's SYN. At this point, the client is ready to send HTTP requests 406 to retrieve the HTML file 402A and all embedded objects (e.g., Object$_1$ and Object$_2$), as described below.

First, client A makes an HTTP request 406A to server 401A for web page 402 (e.g., via client A's browser 405A). Such request may be in response to a user inputting the URL for web page 402 or in response to a user clicking on a hyperlink to web page 402, as examples. Server 401A receives the HTTP request 406A and sends HTML file 402A (e.g., file "index.html") of web page 402 to client A via response 406B. HTML file 402A typically identifies the various objects embedded in web page 402, such as Object$_1$ and Object$_2$. Accordingly, upon receiving HTML file 402A, browser 405A requests the identified objects, Object$_1$ and Object$_2$, via requests 406C and 406E. Upon server 401A receiving the requests for such objects, it communicates each object individually to client A via responses 406D and 406F, respectively. As illustrated by the generic example of FIG. 4, each object of a requested web page is retrieved from a server by an individual HTTP request made by the client. Thus, a given client access of web page 402 may comprise a plurality of request/response pairs (or "transactions"), and thus such an access of web page 402 may be referred to herein as a "composite transaction." For instance, an access of web page 402 is a composite of the request/response pairs for accessing the various objects that make up the web page 402.

Again, the above interactions are simplified to illustrate the general nature of requesting a web page, from which it should be recognized that each object of a web page is requested individually by the requesting client and is, in turn, communicated individually from the server to the requesting client. The above requests/responses 406 may each comprise multiple packets of data. Further, the HTTP requests can, in certain implementations, be sent from a client through one persistent TCP connection with server 401A, or, in other implementations, the requests may be sent through multiple concurrent connections. Server 401A may also be accessed by other clients, such as clients B and C of FIG. 4, and various web page objects may be communicated in a similar manner to those clients through packet communication 407 and 408, respectively.

In many instances, a service provider deploys a web service as a multi-tier client-server application. In such instances, a client typically communicates with the web service via a web interface tier, where the unit of activity at the client-side corresponds to a download of a web page generated by the application. As mentioned above, a web page is generally composed of an HTML file and several embedded objects such as images. A browser retrieves a web page by issuing a series of HTTP requests for all objects: first it retrieves the main HTML file and then after parsing it, the browser retrieves the embedded images. It is very common that a web server and application server reside on the same hardware, and shared resources are used by the application and web servers to generate web pages as well as to retrieve page-embedded objects. In the access logs from Hewlett-Packard's Open View Service Desk (OVSD) application server, for example, there are both types of entries: web page requests and consequent entries for embedded images.

According to one embodiment, the client web page requests, also called web page views, are of interest in determining resource costs 105. Thus, in one embodiment, a web page accessed by the client and generated by the application is considered as a composite transactions, as such web page access includes the various transactions for serving the embedded objects that form such web page.

According to certain embodiments, a service provider collects the server access logs, reflecting processed client requests and client activities at the site. Again, any suitable usage logging applications now known (such as Hewlett-Packard's Open View Service Desk) or later developed, may be used for monitoring the service provider's system and collecting the access logs. According to one embodiment, in the CTRCC 103's analysis, it considers a reduced trace that contains only composite transactions (web page views) as discussed above. All the embedded images, style sheets, and other format-related primitives contained in any composite transactions are omitted, as effectively being absorbed into their respective composite transaction. Moreover, in certain embodiments, the CTRCC 103 further distinguishes a set of unique transaction types and a set of client accesses to them. For static web pages, for example, the URL uniquely defines a file accessed by clients. For dynamic pages, the requests from different users to the same web page URL may appear as requests to different URLs due to the client-specific extension or a corresponding parameter list. Thus, in certain embodiments, the workload profiler 107 or CTRCC 103 carefully filters out these client-specific extensions in the reduced trace.

In certain embodiments, the above-mentioned filtering of transactions to result in a workload that contains composite transactions (eliminating the individual web requests for the objects that form a composite transaction) and containing an identification of a corresponding transaction type of each composite transaction to be analyzed by CTRCC 103, is performed (e.g., by workload profiler 107 and/or some other filtering logic) as part of processing access logs for preparing workload profile 108 to be received by CTRCC 103. In this manner, such filtering logic processes the access logs to form the representative workload subset 120 of workload profile 108 in a form that is convenient for transaction analysis and further processing performed by the CTRCC 103 as described herein. Thus, the representative transactions 120 shown in FIG. 3 as being received by CTRCC 103 may, in certain embodiments, comprise data that has been previously filtered and organized by workload profiler 107 and/or other filtering logic. In other embodiments, such filtering logic may be included as part of CTRCC 103, wherein CTRCC 103 may receive raw data from access logs and perform the above-mentioned filtering and then the processing for determining the resource costs 105 as described further herein.

Moreover, client access to a web service generally occurs in the form of a session that may comprise multiple individual transactions (web pages). For example, in an e-commerce site, placing a purchase order through the web site involves various composite transactions relating to such tasks as selecting a product, providing shipping information, arranging payment agreement, and finally receiving a configuration. As an example, a customer desiring to purchase a book from a website that offers books for sale, the customer may, during such a session, first perform a search on the website to find a book of interest (e.g., perform a book selection transaction), then the customer may provide shipping information and arrange payment for the book (e.g., perform a payment transaction), and finally receive confirmation that the purchase was successful (e.g., perform a confirmation transaction). Such a session for purchasing a book thus includes a plurality of composite transactions. For a customer trying to place an order, or a retailer trying to make a sale, the real measure of such a web service performance is its ability to process the entire sequence of individual transactions needed to complete a higher-level logical transaction, referred to as a session. The number of such concurrent client sessions that a multi-tier system can support without violating a desired QoS target (e.g., without violating transaction response time) is a measure of system capacity that a service provider often desires to evaluate.

Turning now to FIG. 5, an exemplary operational flow of workload profiler 107 according to one embodiment of the present invention is shown. In this exemplary embodiment, workload profiler 107 receives, in operational block 501, representative workload 101 that includes a plurality of composite transactions. In operational block 502, workload profiler 107 characterizes the set of composite transactions and extracts the distribution of the composite transactions over time. In so doing, workload profiler 107 may determine, in block 503, a subset of the plurality of composite transactions (e.g., subset 120) to use for computing resource costs. Such a determination of the subset of composite transactions may be made in any of many different ways. As one example, in certain embodiments, for each composite transaction in the representative workload 101, workload profiler 107 may determine whether the frequency of the composite transaction exceeds a defined popularity threshold, such as in operational block 504. As another example, in certain embodiments, workload profiler 107 may determine, such as in block 505, the "K" most popular composite transactions in the received representative workload 101, wherein K may be any number such as 10, 15, 20, 50, 1003 etc., that is less than the number of different types of composite transactions contained within the received representative workload 101.

In operational block 506, workload profiler 107 characterizes a set of user activities reflected in the workload by analyzing and extracting the session characteristics over time. For instance, in operational block 507, session characteristics may be extracted and used to determine such client behavior characteristic information 121 as "think time" 304 for at least one type of session. As discussed further herein, different types of sessions may have different average think times 304, and thus the corresponding think time 304 for each of different types of sessions present in the representative workload 101 may be determined in certain embodiments.

Understanding user activities at the session level is desirable for intelligent capacity planning, as the number of concurrent sessions in the trace is actually a representation of the number of concurrent clients handled by the system. If traces are collected independently at multiple application servers supported by heterogeneous machines with different CPU) speeds, then the workload in each machine may be evaluated to further understand the users session-based behavior. Also, according to one embodiment, the client think time 304 is measured for a computing systems 115 under study. Typically, think time is measured from the moment when the client receives a transaction reply until the moment when the client issues the next transaction. Larger think time leads to a slower arrival rate of transactions issued to the server by this client session. In general, the larger the client think time exhibited by clients reflected in the representative workload, the larger number of concurrent client sessions that may be supported by the given computing system under analysis.

According to certain embodiments, computing system 115 that is being analyzed using real (live) workloads 101 of such computing system 115 may exhibit one or more of the following characteristics:

a) The transaction mix in the representative workload 101 varies over time and hence cannot be treated as a fixed, stationary distribution.

b) The computing system 1115 reflects a strong diurnal access behavior with a regular and predictable weekly load patterns.

c) The workloads exhibit a strong locality property, i.e., a relatively small set of core transaction types is responsible for most of the client accesses.

d) Most of the clients are inactive until timeout after issuing a few transactions, resulting in the high average think time. Embodiments of the present invention may be employed to nevertheless provide an intelligent capacity analysis of such computing system 115. Of course, embodiments of the present invention are not limited in application to analysis of computing systems exhibiting one or more of the above-noted characteristics, but may likewise be employed for analyzing other computing systems.

In certain embodiments, a statistical regression-based analysis may be employed by regression-based solver 104 to determine (e.g., estimate) a corresponding resource cost 105 for each composite transaction 303 included in the received representative transactions 120. An exemplary statistical regression-based analysis that is employed by regression-based solver 104 according to one embodiment of the present invention is now described with reference to FIG. 6. This exemplary regression-based analysis is described for computing CPU costs of a server for serving web pages, and thus according to this exemplary embodiment, a client web page request is considered as the main, basic unit of client/server activity. However, the exemplary regression-based analysis may likewise be employed for computing CPU (and/or other resource) costs associated with serving other types of composite transactions, and thus is not limited in application to analysis of web page accesses.

As mentioned above, often an application server is also responsible for serving the embedded objects of a page (e.g., embedded images, etc.). Thus, it may be desirable for the capacity planning framework 106 to evaluate the overall CPU resources consumed by the application server for corresponding transaction processing, e.g., for generating the requested web page and also retrieving and serving all the embedded objects in the above example. In other words, it may be desirable to evaluate the overall CPU resources utilized by a given tier of a multi-tier architecture (e.g., by the application server of a three-tier architecture) in serving a composite transaction.

There are no common tools for effectively measuring the service times for all these objects, while the accurate CPU consumption estimates are required for capacity planning of the systems operating under real workload mix. While one may build such a tool by explicitly instrumenting the application with additional measurements, this would be an application-dependent and obtrusive solution that might lead to significant overhead, and is thus not used in practice. On the other hand, it should be recognized that embodiments of the present invention described herein are not application dependent and do not require modification of the applications for inclusion of additional logic for explicit instrumentation (and thus do not lead to significant overhead in the operation of the applications for determining resource costs).

According to certain embodiments of the present invention, the exemplary method for determining resource costs of composite transactions, which is based on a statistical regression technique, provides an efficient and simple way to accurately approximate the CPU cost (e.g., overall CPU service time) of different composite transactions. This exemplary method has a unique ability to "absorb" some level of uncertainty or noise present in real-world data. Thus, it can be effectively employed for evaluating an actual historical workload of a computing system that is under analysis. As described below, combining the knowledge of critical workload features of a system under analysis with a statistical regression technique provides an elegant and powerful solution for performance evaluation of complex systems with real workloads.

According to this exemplary embodiment, a number of different transactions are observed over fixed-length time intervals, denoted as monitoring windows, in order to capture the changes in user behaviors. Thus, a monitoring window is defined in operational block 601 of FIG. 6, and a number of different composite transactions are observed in one of more of such monitoring windows in operational block 602. The time length of the monitoring window should preferably be selected intelligently. The monitoring window should not be too small (in order to avoid the representative workload contained therein from being too noisy), and the monitoring window should not be too big (in order to avoid overlooking the variance of user activities). In the experiments described herein, we consider 1 hour as a reasonable window length, but the monitoring window length may be determined to be set to some other time period based on the above-mentioned factors.

The transaction mix and system utilization are recorded at the end of each monitoring window, such as shown in the example of Table 1 below. Thus, for each monitoring window, the transactions observed therein are organized by transaction type in block 603, and the resource utilization (e.g., CPU utilization) is recorded for each monitoring window. In general, the different transaction types, refer to different activities/functionalities of the application and/or different web pages related to the site and processed by the service provider's hardware under study. The different transaction types are typically present in the application logs. As an example, one type of transaction for a banking application may be a transaction in which a client views his account balance, while a client transferring funds between accounts might be a second transaction type of the banking application.

TABLE 1

An example of transaction profile in machine 1

| Time (hour) | $N_1$ | $N_2$ | $N_3$ | $N_4$ | ... | $N_{756}$ | $U_{CPU}(\%)$ |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |
| 4 | 22 | 2 | 4 | 7 | ... | 0 | 6.4274 |
| 5 | 38 | 5 | 6 | 7 | ... | 0 | 7.5458 |
| ... | | | | | | | |

In the example of Table 1, 5 monitoring windows are shown that are each 1 hour in length. In each monitoring window, the number of transactions of a given type are recorded, wherein one or more of the transaction types may be composite transactions. For instance, in the example of Table 1, there are 756 different types of transactions, and the number of occurrences of each transaction type within each monitoring window is recorded. Also, the CPU utilization of each monitoring window is recorded. For instance, the CPU of the system under analysis was utilized 13.3201% of the 1-hour period of time of the first monitoring window shown in Table 1. As described further below with reference to Table 2, in operational block 604, a subset of core transaction types may be determined by workload profiler 107, and the resource utilization (e.g., CPU utilization) for the determined subset of core transaction types is recorded for each monitoring window.

As an exemplary application of this representative embodiment, let us assume that there are a total of M transaction types processed by the server (or other computing system) under analysis. Let us use the following denotations:

T is the length of the monitoring window;

$N_i$ is the number of transactions of the i-th type, where $1 \le i \le M$;

$U_{CPU,n}$ is the average CPU utilization during this monitoring window at the n-th tier of an application;

$D_{i,n}$ is the average service time of transactions of the i-th type at the n-th tier, where $1 \le i \le M$; and $D_{0,n}$ is the average CPU overhead related to "keeping the system up" activities at the n-th tier. For example, there are generally some OS processes and/or background jobs that consume CPU time even when there is no transaction to be serviced in the system. Thus, $D_0$ can be defined to represent such overhead that is typically present in the system under analysis.

From the utilization law, Equation (1) below can be obtained for each of the monitoring windows:

$$D_{0,n} + \sum_i N_i \cdot D_{i,n} = U_{CPU,n} \cdot T. \qquad (1)$$

It is practically infeasible to get accurate service times $D_{i,n}$ because this is an overconstrained problem. That is, the exact solution (accurate service times) is feasible for M number of equations with M unknowns (variables). In the above analysis, on the other hand, there are N number of equations where N>K, and is thus an overconstrained problem, wherein it becomes desirable to find an approximate solution that leads to a small error. Since it is practically infeasible to get accurate service times $D_{i,n}$, we let $C_{i,n}$ denote the approximated CPU cost of $D_{i,n}$ for $1 \le i \le M$. Then an approximated utilization $U'_{CPU,n}$ at call be calculated as ("Equation (2)"):

$$U'_{CPU,n} = \frac{C_{0,n} + \sum_i N_i \cdot C_{i,n}}{T}.$$

A statistical regression-based analysis may be employed to solve for $C_{i,n}$. Thus, in operational block 606 of FIG. 6, a regression-based analysis is used to approximate $C_{i,n}$ to determine the average CPU cost of the core transactions of the i-th type for each monitoring window. According to certain embodiments, to solve for $C_{i,n}$, one can choose a regression method from a variety of known methods in the literature, such as the regression methods described in "Algorithms" by R. Sedgewick, Addison-Wesley Publishing Company, Second Edition (see e.g. description beginning at page 551 thereof), the disclosure of which is hereby incorporated herein by reference. A typical objective for a regression method is to minimize either the absolute error:

$$\sum_j |U'_{CPU,n} - U_{CPU,n}|_j$$

or the squared error:

$$\sum_j (U'_{CPU,n} - U_{CPU,n})^2_j,$$

where j is the index of the monitoring window over time.

Finding the best fitting method is outside the scope of this disclosure, and is not described in great detail so as not to unnecessarily detract attention away from the invention. Although, as one example, in some of our experiments we use the Non-negative Least Squares Regression (Non-negative LSQ) provided by MATLAB to get $C_{i,n}$. This non-negative LSQ regression is to minimize the error $$e = \sum_j (U'_{CPU,n} - U_{CPU,n})^2_j$$

such that $C_{i,n} \geq 0$.

The exemplary statistical regression-based analysis proposed above works very well for estimating the CPU demands of composite transactions that themselves might represent a collection of smaller objects, whereas direct measurement methods (e.g., explicitly instrumenting the application under analysis with additional measurements) are not practical, as discussed above.

Finding a solution for a large number of equations with many (e.g., 1000) variables leads to a high complexity of regression method and requires a high computing time. Workload studies have shown that web workloads typically exhibit a very high degree of reference locality, i.e., a small subset of site transactions is responsible for a very high percentage of client accesses. So, a question arises regarding whether accurate performance results can be obtained by approximating the resource cost (e.g., CPU cost) of a much smaller set of popular transactions, which may be referred to herein as "core" transactions. In other words, if the above-described regression method is used to find the CPU cost of a small number of core composite transactions, can this small set be useful for an accurate evaluation of the future CPU demands in the system?

Following this idea, according to certain embodiments of the present invention, we only use the columns $N_i$ to $N_k$ and $U_{cpu,n}$ in Table 1 to approximate $C_{i,n}$ for $1 \leq i \leq N$ as shown in Table 2. Workload profiler 107 may employ techniques as described further herein for determining the reduced subset of transactions $N_i$ to $N_k$ that are used in this analysis. The approximated $U'_{CPU,n}$ of every hour is then computed by these $N_i$ to $N_k$ and $C_{i,n}$ to $C_{k,n}$ values.

TABLE 2

| Time (hour) | $N_1$ | $N_2$ | $N_3$ | $N_4$ | ... | $N_K$ | $U_{CPU}$(%) |
|---|---|---|---|---|---|---|---|
| 1 | 21 | 15 | 21 | 16 | ... | 0 | 13.3201 |
| 2 | 24 | 6 | 8 | 5 | ... | 0 | 8.4306 |
| 3 | 18 | 2 | 5 | 4 | ... | 0 | 7.4107 |
| 4 | 22 | 2 | 4 | 7 | ... | 0 | 6.4274 |
| 5 | 38 | 5 | 6 | 7 | ... | 0 | 7.5458 |
| ... | | | | | | | |

Thus, as shown in operational block 604, such a subset of K core transaction types are determined by workload profiler 107, and the regression-based analysis is performed in operational block 606 to approximate $C_{i,n}$ for the K core transaction types. In this manner, the composite transactions of the most popular transaction types of a representative workload may be heavily relied upon for performing the capacity planning analysis of a computing system, which may improve computing efficiency and/or lead to increased accuracy in capacity planning results, as discussed above.

While the above description has concentrated on evaluating the CPU capacity required for support of a given workload, application of the concepts described herein are not limited to determining such CPU costs. Rather, the regression-based analysis methods described herein may likewise be efficiently applied for evaluating other shared system resources that have an "additive" capacity nature. As one example, embodiments of the present invention may be applied for estimating the latency of the different links on the network path when end-to-end measurements are given but the link's delay of the path is unknown. As another example, the above-described embodiments may be employed for evaluating transactions' memory usage estimates.

To validate the above-described approach that uses a subset 120 of most popular composite transactions from a representative workload 101, a validation analysis was performed using 1-month long access logs from two heterogeneous application servers that provide customized client access to a popular and actively used HP service: Open View Service Desk (OVSD). In this exemplary validation analysis, we considered a reduced trace that contained only composite transactions (web page views) as discussed above, wherein we omitted all embedded images, style sheets, and other format-related primitives. Moreover, we further distinguished a set of unique transaction types and a set of client accesses to them. For static web pages, the URL uniquely defines a file accessed by clients. For dynamic pages the requests from different users to the same web page URL may appear as requests to different; URLs due to the client-specific extension or a corresponding parameter list. Thus, we carefully filtered out these client-specific extensions in the reduced trace. In this example, there were 984,505 transactions in the reduced trace. Overall, in the reduced trace, there were 756 different unique transactions (or transaction types).

In this exemplary validation analysis, we further ordered different transaction types by number of client accesses (i.e., transactions were ranked by their respective popularity). The transaction with rank 1 represents the most popular transaction type. The studied workload exhibited a very high degree of reference locality: i.e., a small subset of site transactions is responsible for a very high percentage of client accesses, e.g.:

the most popular (rank 1) transaction type is responsible for 30.9% of the total accesses;

the top 5 transaction types accumulate 61.1% of all the client accesses;

the top 10 transaction types accumulate 79.1% of all the client accesses;

the top 20 transaction types are responsible for 93.6% of the site accesses; and the top 100 transaction types account for 99.8% of all the site accesses.

For sensitivity analysis, we considered the results produced by the exemplary above-described non-negative LSQ regression method when K is equal to 10, 20, 60 and 100 transactions respectively. That is, we considered most popular subsets containing 10, 20, 60, and 100 of the most popular composite transactions present in the representative workload, respectively.

We used the relative error of the approximated utilization as the metric to validate the regression accuracy. For every hour, the relative error of the approximated utilization is defined as:

$$Error_R = \frac{|U'_{CPU} - U_{CPU}|}{U_{CPU}}.$$

We divided the OVSD trace into two parts. The first half was used as a training set to solve for the CPU cost $C_i$ using the non-negative LSQ regression method. The second half was considered as a validating set. Note that the administration jobs during weekends might introduce a significant noise to the CPU utilization as explained before. Thus, the training set for the regression was composed of the data from the workday only, in this example.

Our analysis of transaction mix over time in the above-mentioned OVSD trace shows that the transaction mix is not stable over time. During the weekends, 20% of the entire transactions are for the second popular transaction type, 10% are for the fifth one and another 10% for the sixth one, while the transactions for the most popular type only take around 5%. However for the peak time during the workdays, 40% of the transactions are for the most popular one. Even during the same workday, the transaction mix is changing from hour to hour.

Traditional capacity planning methodology usually examines the peak loads and system utilization to conclude the number of clients that can be handled. These methods aim to accommodate variations in load while assuming that the set of workload transactions is stationary, i.e. the distribution of different transaction types in workload mix is fixed. Many of industry standard benchmarks are built using this principle, e.g., SpecWeb96,TPC-W, while real workloads rarely exhibit this feature as shown by the analysis above. Therefore, instead of focusing on loads solely, a robust capacity planning methodology additionally considers the changing workload mix since the system capacity directly depends on the types of user performed activities. Embodiments of the present invention may be employed for achieving such a robust capacity planning that considers the changing workload mix and types of user activities performed in the workload mix.

Figure 8:
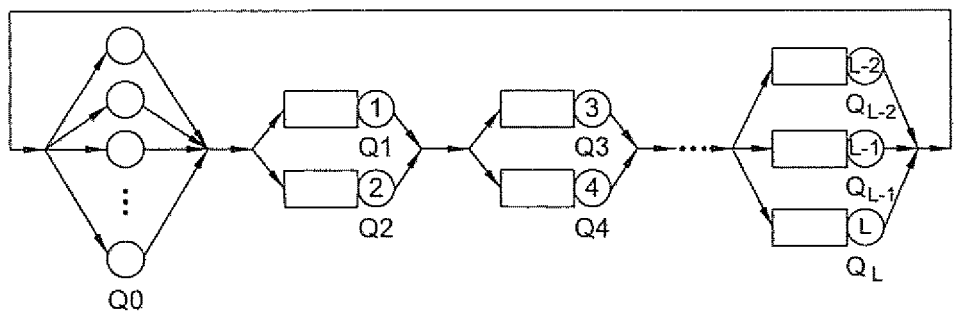
FIG. 8 shows an exemplary analytical model that models a multi-tier system as a closed system with a network of queues in accordance with one embodiment of the present invention.
Figure 7:
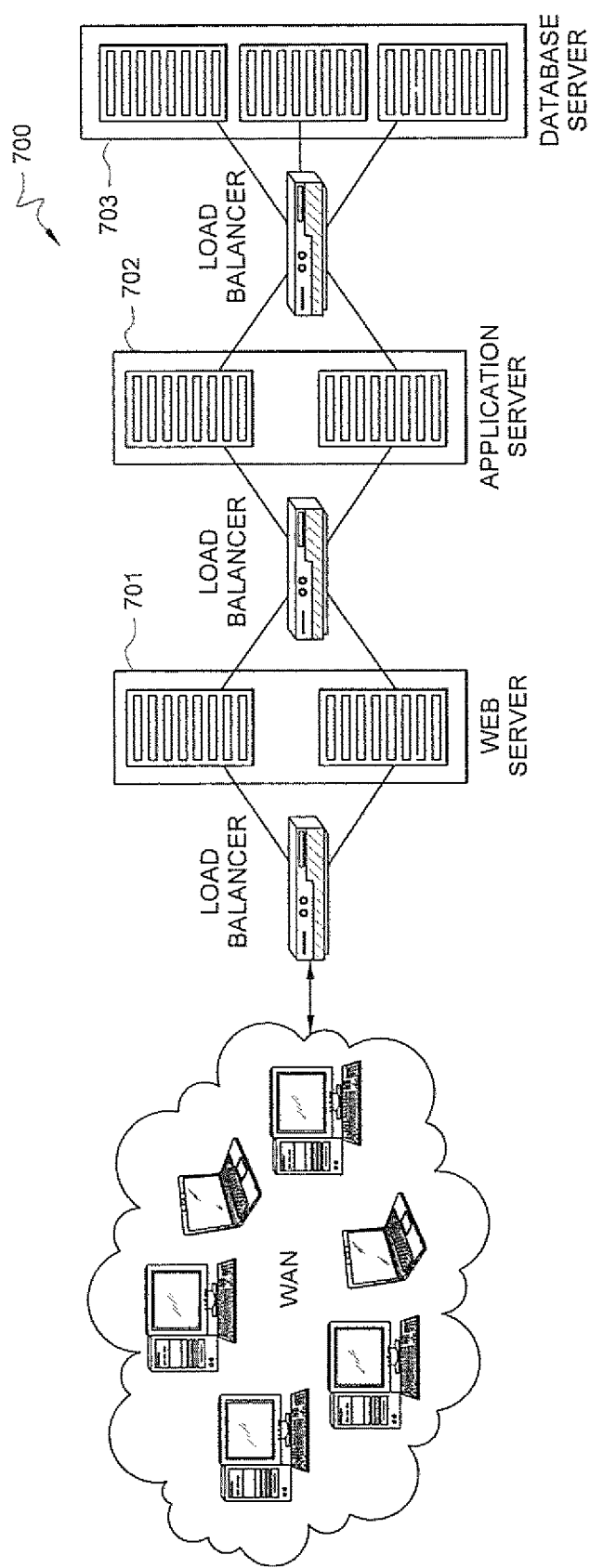
FIG. 7 shows an exemplary computing system having a multi-tiered structure, which may be analyzed according to certain embodiments of the present invention.

An exemplary analytical model 111 that is employed by capacity analyzer 110 in certain embodiments for modeling a multi-tiered application is now described further with reference to FIGS. 7-8. Modern Internet servers typically employ a multi-tiered structure of web servers 701 (e.g., interface tier), application servers 702 (e.g., application tier), and databases 703 (e.g., data tier), such as that of exemplary system 700 shown in FIG. 7. Each tier receives the requests form its preceding tier, and may generate certain requests to its successor. For improved scalability, a tier may have several replicated machines. These machines may be heterogeneous, and a dispatcher may employ a special load balancing strategy for distributing the incoming requests across the replicated servers.

Due to the session-based client behavior discussed above, a multi-tier system may be modeled as a closed system with a network of queues, such as shown in FIG. 8. The number of clients in the system is fixed. That is, according to one embodiment, the analytical model is solved for finding the response time with a fixed number of clients (such as the number clients whose activities are reflected in the representative workload 101). If the analytical model determines that the response time of the computing system under analysis satisfies given QoS desires 113, then the number of clients is increased and the model is solved again. In such a way, the number of clients can be iteratively adjusted and the analytical model may be used to find the maximum number of clients that the computing system under analysis can handle while still supporting the desired QoS 113.

When a client receives a response from the server, it waits for a certain think time, and then issues another request. According to certain embodiments, this think time 304 is modeled as an infinite queue $Q_0$ in FIG. 8. Once the service time in each queue is obtained, this closed system can be solved efficiently by the Mean-Value Analysis (MVA) algorithm, see B. Urgaoukar, G. Pacifici, P. Shenoy, M. Spreitzer, and A. Tautawi, "An Analytical Model for Multi-tier Internet Services and its Applications", In *Proc. of the ACM SIGMETRICS* 2005, Banff Canada, June 2005, the disclosure of which is incorporated herein by reference.

As discussed above, workload characterization of real traces shows that the workload mix often changes over time for a computing system under analysis, and hence the service time may not properly be modeled as a fixed distribution. However, this is a reasonable assumption for the workload within a shorter time interval (e.g., 1 hour). According to one embodiment, the capacity planning framework 106 performs the capacity planning procedure for each monitoring time window, and then combines the results across these time points to get an overall solution.

Now, the MVA algorithm is briefly reviewed, and a case study with a real workload is described to illustrate the capacity planning process employed by capacity planning framework 106 in one embodiment of the present invention. The MVA algorithm is based on the key assumption that when a new request enters the queue, the system has exactly the same statistics as the system without this new request. This theory applies for any product-form closed systems. The following pseudocode in Table 3 provides a description of the detailed MVA algorithm:

TABLE 3

Inputs:

N = number of users
Z = think time
L = number of devices
$S_i$ = service time per visit to the i-th queue
$V_i$ = number of visits to the i-th queue Outputs:

X = system throughput
$Q_i$ = average number of jobs at the i-th queue
$R_i$ = average response time of the i-th queue
R = system response time (excluding think time)
$U_i$ = utilization of the i-th queue
1. Initialization: for i = 1 to L do $Q_i \leftarrow 0$
2. Iterations:
    for n = 1 to N do
        a.    for i = 1 to L do
            $R_i = S_i(1 + Q_i)$
        b.
$$R = \sum_{i=1}^{L} R_i V_i$$
        c.
$$X = \frac{n}{Z + R}$$
        d.    for i = 1 to L do $Q_i = XV_iR_i$
3. for n = 1 to L do
    a.    $X_i = XV_i$
    b.    $U_i = XS_iV_i$ The visit ratio $V_i$ can be decided by the load balancing policy. For example, if the load balancing policy is equally partitioning the load across all the machines, then the number of visits $V_s$ to machine s in tier l is equal to $1/m_l$, where $m_l$ is the number of machines in tier l.

It should be noted that the traditional MVA (as in Table 3 above) takes the number of clients N as inputs and computes the average performance metrics for a system with N clients. However in capacity planning, the number of clients is unknown. Thus, it becomes desirable for the model to be solved for this unknown. In certain embodiments, we assume that the Service Level Agreement (SLA) specifies a threshold $\Gamma_R$ of the average transaction response time. Then the condition in step 2 of the above-described traditional MVA is changed to "while $R \leq \Gamma_R$ do" as shown in the pseudocode of Table 4 below.

TABLE 4

Inputs:

N = number of users
Z = think time
L = number of devices
$S_i$ = service time per visit to the i-th queue
$V_i$ = number of visits to the i-th queue Outputs:

X = system throughput
$Q_i$ = average number of jobs at the i-th queue
$R_i$ = average response time of the i-th queue
R = system response time (excluding think time)
$U_i$ = utilization of the i-th queue
1. Initialization: for i = 1 to L do $Q_i \leftarrow 0$, $n \leftarrow 1$
2. Iterations:
    while $R \leq \Gamma_R$ do
        a.    for i = 1 to L do
            $R_i = S_i(1 + Q_i)$ TABLE 4-continued b.
$$R = \sum_{i=1}^{L} R_i V_i$$
        c.
$$X = \frac{n}{Z + R}$$
        d.    for i = 1 to L do $Q_i = XV_iR_i$
        e.    n = n + 1
3. for n = 1 to L do
    a.    $X_i = XV_i$
    b.    $U_i = XS_iV_i$ Now, we briefly describe how the above-described exemplary embodiment of capacity planning framework 106 may be employed to answer the following capacity planning question: How many clients can be supported by the existing system while providing the desirable performance guarantees, e.g., response time under $\Gamma_R$ sec., and assuming that the system processes a given (varying, non-stationary) type of workload?

A detailed operational flow performed by one exemplary embodiment of capacity planning framework 106 is now described. First, the workload profiler 107 receives a representative workload 101 and operates as follows:

For each monitoring window w, and each machine s:
    a. collect the number of transactions $N_{i,s,w}$ of each type i;
    b. collect the average utilization $U_{s,w}$.

For each monitoring window w:
    a. select the top K most popular transaction types;
    b. collect the transaction mix in the system, i.e., the percentage $p_i$ of the transactions for type i for all $1 \leq i \leq K$;
    c. collect the average think time $Z_w$.

The regression-based solver 104 receives the transactions 120 of the top K most popular types determined by the workload profiler 107, and regression-based solver 104 operates as follows:

For each machine s:
    Compute the cost function $C_{i,s}$ for each transaction type i as described above, where $1 \leq i \leq K$.

The analytical model 111 receives the resource costs 105 computed by the regression-based solver-104 and the think time 304 determined by the workload profiler 107, and analytical model 111 operates as follows:

For each monitoring window w:
    a. approximate the service time $S_s$ for each machine s as $S_s = \sum_{i=1}^{K} p_i \cdot C_{i,s}$;
    b. compute the maximum number of clients $MAX_w$ can be handled with average response time less than $\Gamma_R$ using MVA algorithm.

Build the profile with entry as $(w, MAX_w)$.

Find the minimal $MAX_w$ value X. (X is the number of concurrent customers the system can support with the average transaction response time less than $\Gamma_R$).

In the above exemplary embodiment, capacity planning is performed for the top K most popular transaction types present in representative workload 101. Following operational step (a) identified above for the analytical model (i.e., approximating the service time $S_s$), the average service time for each 1-hour time interval is approximated for all the machines under study (e.g., two machines in our experiments with OVSD traces). Then, the number of concurrent sessions (clients) and the think time are measured for each time interval respectively. In this way, for each time interval we have a vector of parameters representing the average think time, the average service time, and the number of concurrent clients. We solve the problem for each machine by applying the MVA model at each time interval, in this exemplary embodiment.

The results we obtained in an exemplary validation analysis of the above-described embodiment of the capacity planning framework are now briefly discussed. In performing this analysis, we assumed that there is enough network bandwidth for an efficient support of a given workload. We also assumed, that a service provider use a stress test for measuring the maximum number of concurrent users the application server can support for a given memory size. Typically, memory requirements increase linearly with the increased number of concurrent users in the system. Thus, memory size sets another upper bound on the number of concurrent clients for evaluated system. In this analysis, we concentrated on evaluating the CPU capacity requirements for support of a given workload with a specified constraint on the response latency. This additional latency constraint makes this modeling problem non-trivial and challenging.

Figure 9A:
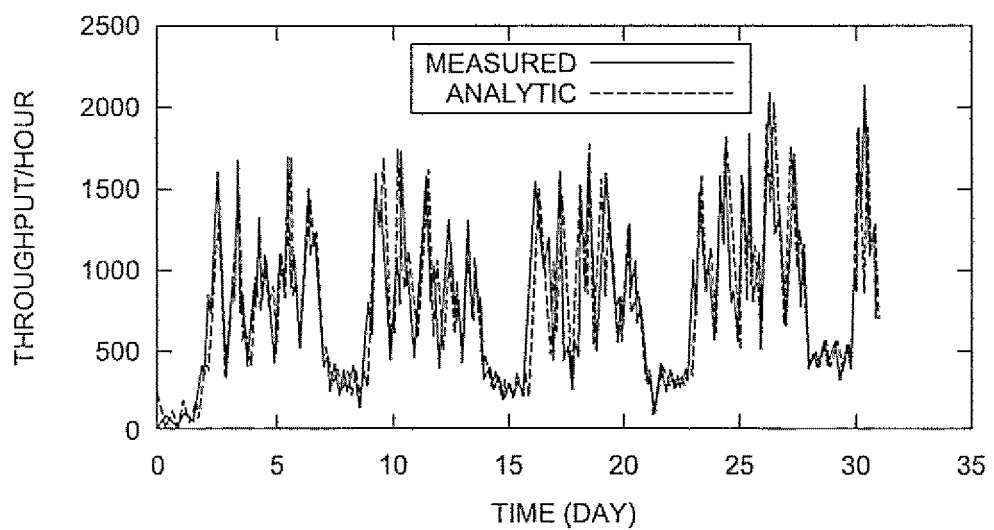
FIG. 9A shows a graph illustrating validation results by comparing the throughput of an analytical model and measured transaction throughput of a case study conducted for one embodiment.

FIG. 9A shows the validation results by comparing the throughput of the analytical model and the measured transaction throughput of machine 1. The analytical model captures the real system behavior well, with 90% of the relative errors fall under 18.7%.

Figure 9B:
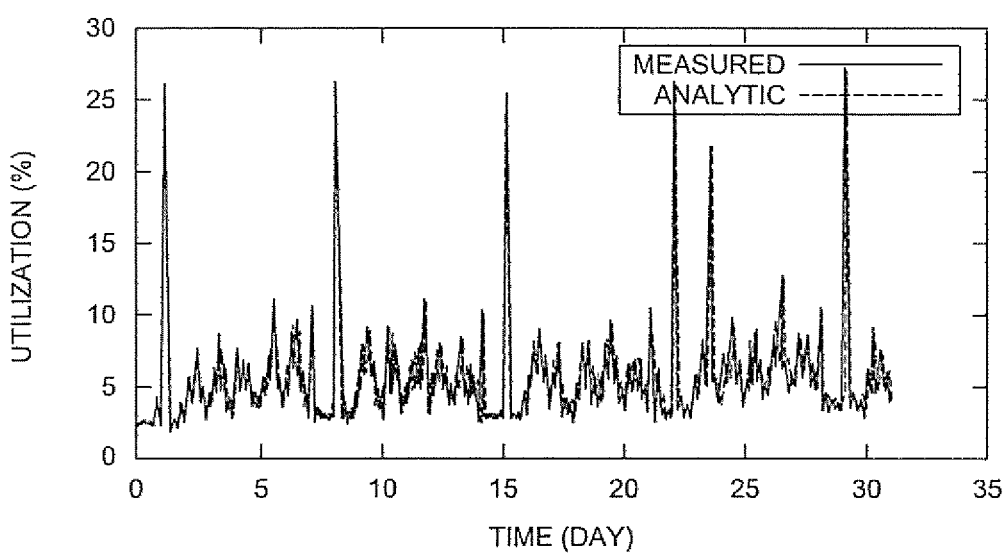
FIG. 9B shows a graph illustrating comparison of the average measured utilization over time with the utilization results provided by the analytical model of one embodiment as obtained in the case study.

FIG. 9B compares the average measured utilization over time with the utilization results provided by the analytical model. We observe a perfect match between the measured and analytical model results. The exceptions are the utilization spikes observed in the real system measurements over weekends that are due to special administration-related tasks. Our method predicts a much lower CPU utilization using the observed transaction mix for these time periods. This presents an additional functionality of our method that can help in generating "alarm" conditions when predicted utilization for processing the existing workload significantly deviates from the system measurements.

The analytical results for machine 2 show a similar performance, and therefore we do not present them here.

The summary of results of this exemplary case study are shown in Table 5 below, i.e. the maximum number of clients that can be supported by machine 1 and machine 2 under the changing OVSD transaction mix over time, where the response time is limited by $\Gamma_R$ equal to 1, 3, 6 and 10 seconds respectively. As expected, machine 2 has a much higher capacity than machine 1. Higher value of threshold $\Gamma_R$ allows a larger number of clients be supported by the system.

The capacity of the entire application server composed of these two machines is determined by the load balancing policy as well. For example, if the SLA defines that the average transaction response time is not higher than 1 seconds, the studied application server can handle 1821 concurrent clients but only if the load balancer is aware of the heterogeneous capacity of these two machines and can split the load proportionally to the servers' capacity. While if the load balancer is partitioning the load equally, the capacity reduces to 944, only half of the previous one. Such a big difference indicates the significant impact of a good load balancing policy on the system capacity, and should be taken into account in any heterogeneous system.

TABLE 5

Maximum number of clients under different $\Gamma_R$

| $\Gamma_R$ (sec) | Machine 1 | Machine 2 | Total |
|---|---|---|---|
| 1 | 472 | 1349 | 1821 |
| 3 | 528 | 1478 | 2006 |
| 6 | 565 | 1534 | 2099 |
| 10 | 608 | 1580 | 2188 |

Figure 10:
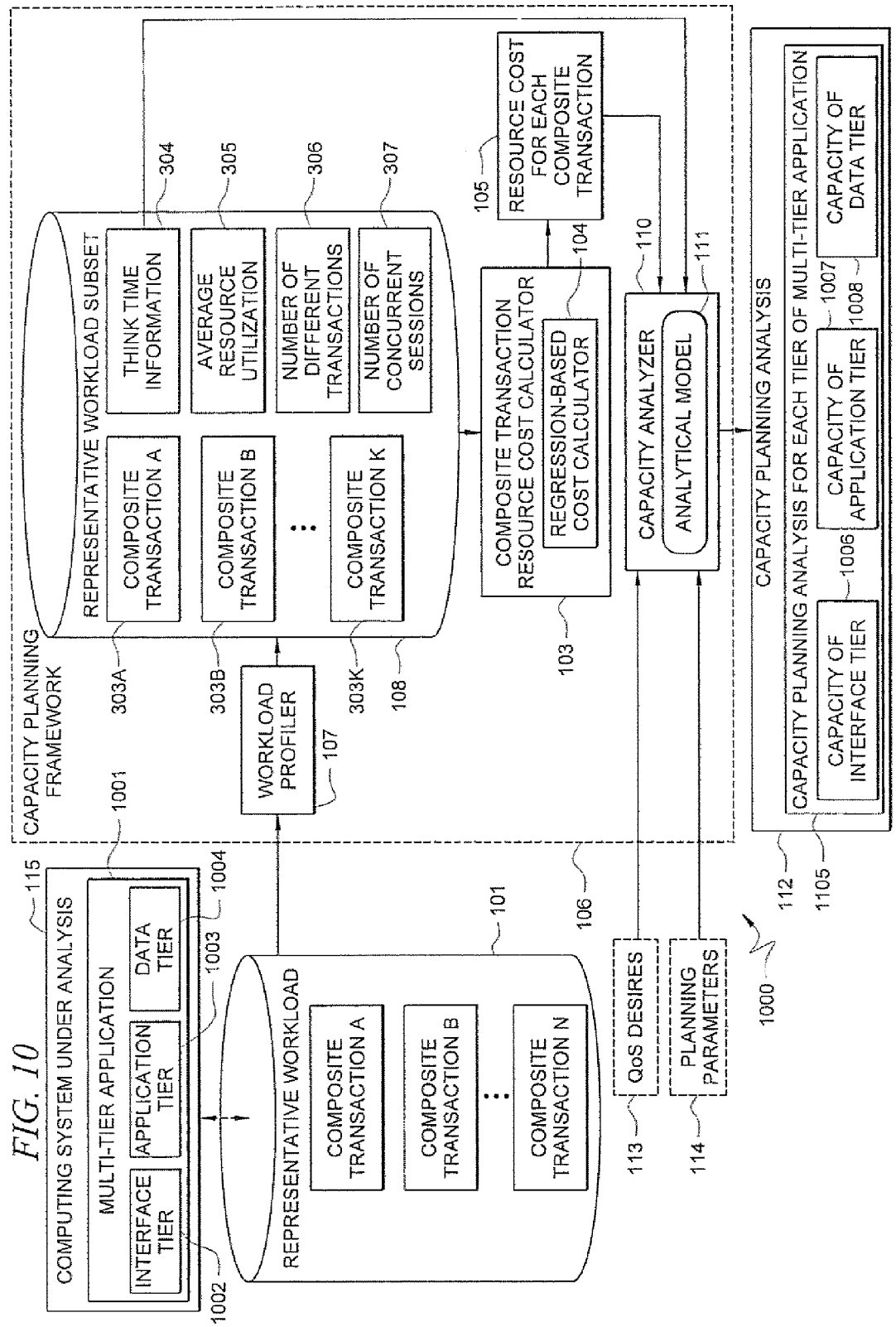
FIG. 10 shows another exemplary system according to an embodiment of the present invention shown, wherein a computing system hosting a multi-tier application is analyzed to determine a corresponding capacity of each tier.

Turning to FIG. 10, another exemplary system 1000 according to an embodiment of the present invention shown. In this example, the computing system 115 that is under analysis hosts at least one multi-tier application, such as multi-tier application 1001 that comprises an interface tier 1002, application tier 1003, and data tier 1004. By employing techniques such as those described above, capacity planning framework 106 determines a capacity planning analysis 112 that includes a capacity planning analysis 1005 for each of tier of the multi-tier application 1001. That is, capacity planning analysis 1005 may include an identification 1006 of the determined capacity of interface tier 1002, identification 1007 of the determined capacity of application tier 1003, and identification 1008 of the determined capacity of data tier 1004. The determined capacity identifications 1006-1008 may, for example, provide the determined number of clients that can be supported during a specified time interval e.g., over a 1-hour period and/or concurrently) by the corresponding tiers of multi-tier application 1001.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 11:
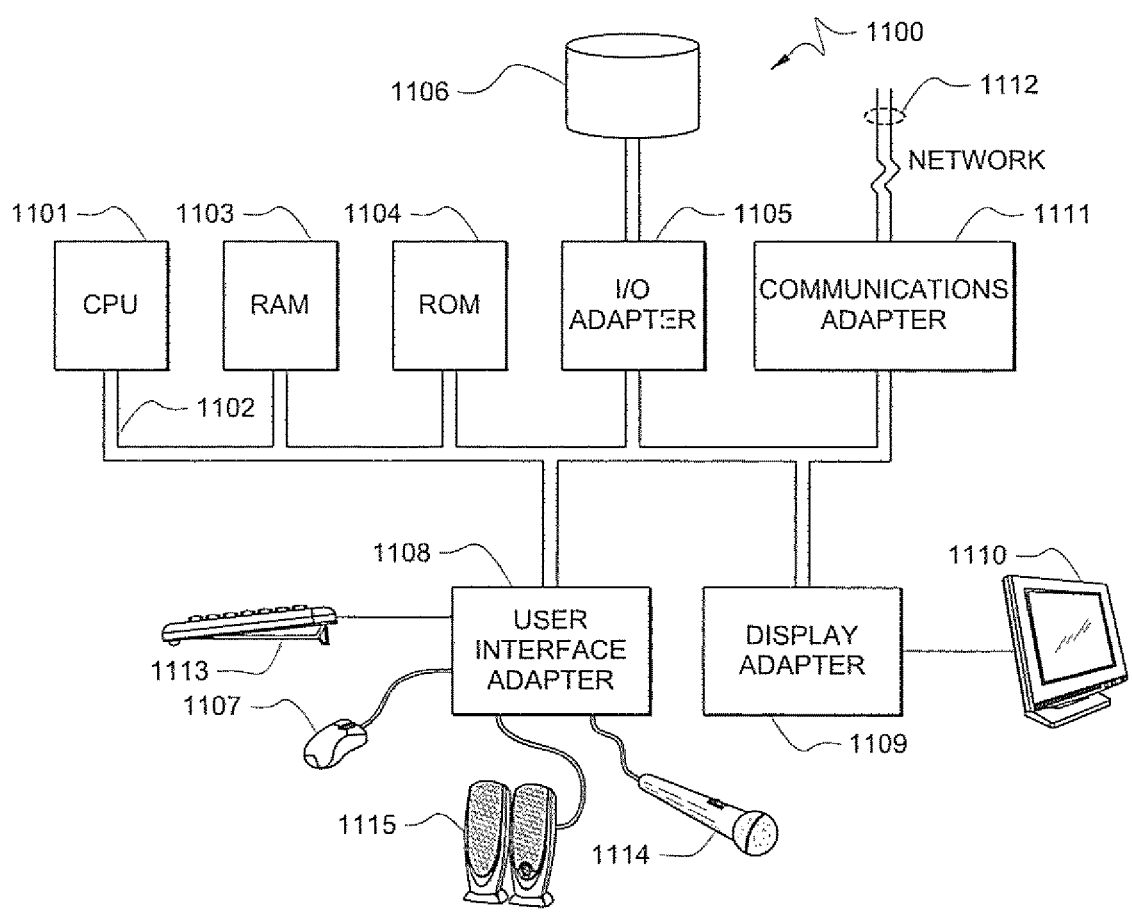
FIG. 11 shows an exemplary system on which a capacity planning framework may be implemented according to one embodiment of the present invention.

FIG. 11 illustrates an exemplary computer system 1100 on which the workload profiler 107, resource cost calculator 103 (and/or regression-based solver 104), and/or capacity analyzer 110 (and/or analytical model 111) may be implemented according to one embodiment of the present invention. Central processing unit (CPU) 1101 is coupled to system bus 1102. CPU 1101 may be any general-purpose CPU. The present invention is not restricted by the architecture of CPU 1101 (or other components of exemplary system 1100) as long as CPU 1101 (and other components of system 1100) supports the inventive operations as described herein. CPU 1101 may execute the various logical instructions according to embodiments of the present invention. For example, CPU 1101 may execute machine-level instructions according to the exemplary operational flows described above in conjunction with FIGS. 2, 5, and 6, and the exemplary operational flows described above for workload profiler 107, regression-based solver 104, and/or analytical model 111.

Computer system 1100 also preferably includes random access memory (RAM) 11030 which may be SRAM, DRAM, SDRAM, or the like. Computer system 1100 preferably includes read-only memory (ROM) 1104 which may be PROM, EPROM, EEPROM, or the like. RAM 1103 and ROM 1104 hold user and system data and programs, as is well known in the art.

Computer system 1100 also preferably includes input/output (I/O) adapter 1105, communications adapter 1111, user interface adapter 1108, and display adapter 1109. I/O adapter 1105, user interface adapter 1108, and/or communications adapter 1111 may, in certain embodiments, enable a user to interact with computer system 1100 in order to input information, such as QoS desires 113 and/or planning parameters 114 of a service provider.

I/O adapter 1105 preferably connects to storage device(s) 1106, such as one or more of hard drive, compact disc (CD) drive, floppy disk drive, tape drive, etc. to computer system 1100. The storage devices may be utilized when RAM 1103 is insufficient for the memory requirements associated with storing data for operations of the workload profiler 107, resource cost calculator 103, and/or capacity analyzer 110 (e.g., representative workload 101, workload profile 108, etc.). Communications adapter 1111 is preferably adapted to couple computer system 1100 to network 1112, which may enable information to be input to and/or output from system 1100 via such network 1112 (e.g., the Internet or other wide-area network, a local-area network, a public or private switched telephony network, a wireless network, any combination of the foregoing). For instance, a representative workload 101 may be input to system 1100 via network 1112 from a remote computer (e.g., from the computing system 115 under analysis), and/or a determined resource cost 105 may be output and communicated via network 1112 to a remote computer. User interface adapter 1108 couples user input devices, such as keyboard 1113, pointing device 11107, and microphone 1114 and/or output devices, such as speaker(s) 1115 to computer system 1100. Display adapter 1109 is driven by CPU 1101 to control the display on display device 1110 to, for example, display information regarding the determined resource cost 150 and/or capacity planning analysis 112 according to certain embodiments of the present invention.

It shall be appreciated that the present invention is not limited to the architecture of system 1100. For example, any suitable processor-based device may be utilized for implementing workload profiler 107, resource cost calculator 103, and/or capacity analyzer 110, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
   receiving, by a workload profiler, a representative workload of a computing system under live analysis;
   determining, by the workload profiler, a workload profile of the computing system that reflects a transaction mix that varies over time,
   wherein the workload profile includes, for each of a plurality of monitoring windows, a plurality of composite transactions where a mix of the plurality of composite transactions varies across the plurality of monitoring windows;
   wherein workload profiler further determines a think time value for at least one session in the representative workload, said at least one session comprising a plurality of related composite transactions for providing a service to a client, and said think time value reflecting idle time of the computing system between the plurality of related composite transactions in the at least one session;
   determining, by a resource cost calculator, resource cost for at least one composite transaction in the representative workload, said resource cost reflecting an amount of utilization of at least one resource of the computing system in serving the at least one composite transaction,
   wherein the amount of utilization is determined by determining for one of the plurality of composite transactions an approximate amount of utilization using a resource cost calculator and a statistical regression-based analysis;
   receiving, by a capacity analyzer, the determined think time value for the at least one session and the determined resource cost for the at least one composite transaction; and
   determining, by the capacity analyzer, a maximum number of clients for each of a plurality of different tiers of at least one multi-tier application supportable by the computing system under analysis for serving the workload profile while satisfying a defined quality of service (QoS) target based on the think time value and the determined resource cost;
   wherein said capacity analyzer employs an analytical model based on a network of queues representing different tiers of the at least one multi-tier application for determining the maximum number of clients for each of a plurality of different tiers of the at least one multi-tier application; and
   performing, by the capacity analyzer, capacity planning based on the determined maximum number of clients.

2. The method of claim 1 wherein the workload profile reflects each of a plurality of composite transaction types present in the representative workload as a fraction of overall transaction types present in the representative workload.

3. The method of claim 1, further comprising:
   wherein said statistical regression-based analysis comprises:
   determining an approximate utilization ($U'_{CPU,n}$) as:

$$U'_{CPU,n} = \frac{C_{0,n} + \sum_i N_i \cdot C_{i,n}}{T};$$

wherein T is a length of a monitoring window during which transactions served by the computing system are monitored; $U'_{CPU,n}$ is an approximation of the average CPU utilization of the computing system during the monitoring window at the n-th tier of an application hosted by the computing system, wherein n comprises at least one tier; $N_i$ is a number of composite transactions of an i-th type of composite transactions, where $1 \leq i \leq M$; and $C_{i,n}$ denotes an approximated average service time of said composite transactions of the i-th type at the n-th tier.

4. The method of claim 1 further comprising:
   determining, by the workload profiler, a subset of composite transactions included in the received representative workload to include in the workload profile.

5. The method of claim 4 wherein said determining the subset comprises:
   determining K most popular composite transaction types in the representative workload, wherein K is a number that is at least 1 and that is less than a total number of composite transaction types included in the representative workload.

6. The method of claim 5 further comprising:
   determining, by a resource cost calculator, resource cost for composite transactions included in the representative workload that are of the determined K most popular composite transaction types, said resource cost reflecting an amount of utilization of at least one resource of the computing system in serving the at least one composite transaction.

7. The method of claim 1 wherein said workload profiler and said capacity analyzer comprise computer-executable software code stored to a non-transitory computer-readable medium.

8. The method of claim 1 further comprises:
determining a maximum number of clients that can be served by the computing system under analysis while satisfying said defined QoS target.

9. The method of claim 8 wherein said maximum number of clients that the computing system can support comprises a maximum number of clients that the computing system can serve within a defined time interval in compliance with said defined QoS target.

10. The method of claim 8 wherein said maximum number of clients comprises a maximum number of clients that the computing system can serve concurrently in compliance with said defined QoS target.

11. The method of claim 1 wherein said defined QoS target comprises a defined maximum response time for said computing system to respond to a client request.

12. A system comprising:
at least one processor;
at least one multi-tier application hosted by a computing system;
a workload profiler that receives a representative workload of the computing system under live analysis, said representative workload comprising a plurality of composite transactions, wherein a mix of the plurality of composite transactions vary over a plurality of monitoring windows;
said workload profiler further determines a think time value for at least one session in the representative workload, said at least one session comprising a plurality of related composite transactions for providing a service to a client, and said think time value reflecting idle time of the computing system between the plurality of related composite transactions in the at least one session;
a resource cost calculator that determines resource cost for at least one composite transaction in the representative workload, said resource cost reflecting an amount of utilization of at least one resource of the computing system in serving the at least one composite transaction, wherein the amount of utilization is determined by determining for one of the plurality of composite transactions an approximate amount of utilization using the resource cost calculator and a statistical regression-based analysis;
a capacity analyzer that receives the determined think time value for the at least one session and the determined resource cost for the at least one composite transaction, and determines a maximum number of clients for each of a plurality of different tiers of the at least one multi-tier application supportable by the computing system under analysis while satisfying a defined quality of service (QoS) target based on the determined think time value and the determined resource cost; and
wherein said capacity analyzer employs an analytical model based on a network of queues representing different tiers of the at least one multi-tier application for determining the maximum number of clients for each of a plurality of different tiers of the at least one multi-tier application and performs capacity planning based on the determined maximum number of clients.

13. The system of claim 12 further comprising:
said workload profiler further determines a subset of the plurality of composite transactions in the representative workload, said subset comprising K most popular composite transaction types in the representative workload, wherein K is a number that is at least 1 and that is less than a total number of composite transaction types included in the representative workload; and
said at least one composite transaction for which said resource cost calculator determines said resource cost comprises composite transactions included in said determined subset.

14. The system of claim 12 wherein said resource cost calculator comprises a regression-based solver that performs the statistical regression-based analysis for determining said resource cost.

15. A method comprising:
receiving, by a workload profiler, a representative workload of a computing system under live analysis, said representative workload comprising a plurality of composite transactions;
determining, by the workload profiler, a subset of the plurality of composite transactions for which a corresponding resource cost is to be determined, wherein the subset of the plurality of composite transactions comprises, for each of a plurality of monitoring windows, a plurality of composite transactions, where a mix of the plurality of composite transactions varies across the plurality of monitoring windows;
determining, by the workload profiler, a think time value for at least one session in the representative workload, said at least one session comprising a plurality of related composite transactions for providing a service to a client, and said think time value reflecting idle time of the computing system between the plurality of related composite transactions in the at least one session;
determining, by a regression-based solver, a resource cost for the at least one composite transaction in the determined subset, said resource cost reflecting an amount of utilization of at least one resource of the computing system in serving the at least one composite transaction in the determined subset;
wherein determining the resource cost is based on an approximated CPU cost of average transaction service times of the computing system; and
determining, by a capacity analyzer, based at least in part on the determined resource cost for the at least one composite transaction and the determined think time value for the at least one session, a maximum number of clients for each of a plurality of different tiers of at least one multi-tier application supportable by the computing system under analysis while satisfying a defined quality of service (QoS) target;
wherein said capacity analyzer employs an analytical model based on a network of queues representing different tiers of the at least one multi-tier application for determining the maximum number of clients for each of a plurality of different tiers of the at least one multi-tier application; and
performing, by the capacity analyzer, capacity planning based on the determined maximum number of clients.

16. The method of claim 15 further comprises:
determining a maximum capacity of the computing system for serving a workload while satisfying a defined quality of service (QoS) target.

17. The method of claim 16 further comprises:

determining a maximum number of clients that can be served by the computing system while satisfying said defined QoS target.

* * * * *